United States Patent
Hotelling et al.

(10) Patent No.: US 8,922,521 B2
(45) Date of Patent: *Dec. 30, 2014

(54) SWITCHING CIRCUITRY FOR TOUCH SENSITIVE DISPLAY

(75) Inventors: Steven Porter Hotelling, San Jose, CA (US); Marduke Yousefpor, San Jose, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1367 days.

This patent is subject to a terminal disclaimer.

(21) Appl. No.: 12/545,754

(22) Filed: Aug. 21, 2009

(65) Prior Publication Data

US 2010/0194698 A1 Aug. 5, 2010

Related U.S. Application Data

(60) Provisional application No. 61/149,294, filed on Feb. 2, 2009.

(51) Int. Cl.
| | |
|---|---|
| *G06F 3/044* | (2006.01) |
| *G06F 3/041* | (2006.01) |
| *G09G 3/36* | (2006.01) |
| *G06F 1/32* | (2006.01) |

(52) U.S. Cl.
CPC .............. *G06F 3/044* (2013.01); *G06F 3/0416* (2013.01); *G09G 3/3648* (2013.01); *G09G 3/3666* (2013.01); *G06F 3/0412* (2013.01); *G09G 2300/0809* (2013.01); *G06F 1/3218* (2013.01)
USPC ....................... 345/174; 178/18.06; 178/20.01

(58) Field of Classification Search
None
See application file for complete search history.

(56) References Cited

U.S. PATENT DOCUMENTS

| 5,483,261 A | 1/1996 | Yasutake |
|---|---|---|
| 5,488,204 A | 1/1996 | Mead et al. |

(Continued)

FOREIGN PATENT DOCUMENTS

| CN | 1246638 A | 3/2000 |
|---|---|---|
| EP | 1 455 264 A2 | 9/2004 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Wayne Young
*Assistant Examiner* — Brian Butcher
(74) *Attorney, Agent, or Firm* — Morrison & Foerster LLP

(57) ABSTRACT

A circuit for switching an LCD between display and touch modes is disclosed. The circuit can include one or more switches configured to switch one or more drive, sense, and data lines in LCD pixels according to the mode. During touch mode, the circuit switches can be configured to switch one or more drive lines to receive stimulation signals, one or more sense lines to transmit touch signals, and one or more data lines to transmit residual data signals. During display mode, the circuit switches can be configured to switch one or more drive lines and sense lines to receive common voltage signals and one or more data lines to receive data signals. The circuit can be formed around the border of the LCD chip or partially or fully on a separate chip.

26 Claims, 15 Drawing Sheets

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,057,903 A | 5/2000 | Colgan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,760,412 B2 | 6/2014 | Hotelling et al. |
| 2005/0007353 A1 | 1/2005 | Smith et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2008/0062140 A1 | 3/2008 | Hotelling et al. |
| 2008/0062148 A1 | 3/2008 | Hotelling et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0309627 A1* | 12/2008 | Hotelling et al. ............. 345/173 |
| 2010/0001973 A1 | 1/2010 | Hotelling et al. |
| 2010/0194695 A1 | 8/2010 | Hotelling et al. |

FOREIGN PATENT DOCUMENTS

| | | |
|---|---|---|
| EP | 1 455 264 A3 | 9/2004 |
| EP | 1 455 264 B1 | 9/2004 |
| JP | 2000-163031 A | 6/2000 |
| JP | 2002-342033 A | 11/2002 |
| JP | 2005-301373 A | 10/2005 |
| JP | 2008-225415 A | 9/2008 |
| KR | 10-2008-0019125 A | 3/2008 |
| TW | 2008-35294 A | 8/2008 |
| WO | WO-2008/047990 A1 | 4/2008 |
| WO | WO-2010/088659 A1 | 8/2010 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report completed Dec. 14, 2011, for CN Patent Application No. ZL201020108330X, Filed Feb. 2, 2010, with English Translation, 22 pages.

European Search Report mailed Jul. 21, 2010, for EP Patent Application 10151969.2, six pages.

European Search Report mailed Dec. 3, 2012, for EP Patent Application No. 12162177.5, seven pages.

European Search Report mailed Feb. 13, 2013, for EP Patent Application No. 12192450.0, six pages.

International Search Report mailed Mar. 10, 2010, for PCT Application No. PCT/US2010/22868, filed Feb. 2, 2010, three pages.

Non-Final Office Action mailed Nov. 23, 2012, for U.S. Appl. No. 12/545,557, filed Aug. 21, 2009, 11 pages.

Notice of Allowance mailed Jun. 10, 2013, for U.S. Appl. No. 12/545,557, filed Aug. 21, 2009, 9 pages.

Non-Final Office Action mailed Jan. 3, 2014, for U.S. Appl. No. 12/545,557, filed Aug. 21, 2009, 9 pages.

Notice of Allowance mailed Apr. 11, 2014, for U.S. Appl. No. 12/545,557, filed Aug. 21, 2009, 9 pages.

* cited by examiner

SWITCHING CIRCUITRY FOR TOUCH SENSITIVE DISPLAY

CROSS REFERENCE TO RELATED APPLICATIONS

This application claims benefit of U.S. Provisional Application No. 61/149,294, filed Feb. 2, 2009, the contents of which are incorporated herein by reference in their entirety for all purposes.

FIELD

This relates to touch sensitive displays having display and touch modes and, more particularly, to circuitry in touch sensitive displays for switching between display and touch modes.

BACKGROUND

Many types of input devices are available for performing operations in a computing system, such as buttons or keys, mice, trackballs, touch sensor panels, joysticks, touch pads, touch screens, and the like. Touch screens, in particular, are becoming increasingly popular because of their ease and versatility of operation as well as their declining price. Touch screens can include a touch sensor panel, which can be a clear panel with a touch sensitive surface, and a display device such as a liquid crystal display (LCD) that can be positioned behind the panel so that the touch sensitive surface can substantially cover the viewable area of the display device. Touch screens can generally allow a user to perform various functions by touching or near touching the touch sensor panel using one or more fingers, a stylus or other object at a location dictated by a user interface (UI) having virtual buttons, keys, bars, displays, and other elements, being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Because typical touch screens have the touch sensor panel overlaying the display device, the touch screens can be heavier, thicker, and dimmer. A lighter, thinner, and brighter touch screen has been developed in which the touch sensor panel is integrated with the display device to provide both display and touch capabilities. Such a touch screen is described in U.S. patent application Ser. No. 11/760,080, entitled "Touch Screen Liquid Crystal Display," and Ser. No. 12/240,964, entitled "Display with Dual-Function Capacitive Elements," the contents of which are incorporated herein by reference in their entirety for all purposes.

However, because both the display and touch circuitry for controlling the integrated touch sensor panel and display device must be implemented on such an integrated touch screen, the advantages of an integrated touch screen (lighter and thinner) can be negated. The additional circuitry can also increase the power requirements of the touch screen. Furthermore, because it is desirable to have a smaller LCD chip, the border area of the chip can be limited, such that it can be difficult to effectively include both the display and touch circuitry thereon.

SUMMARY

This relates to circuitry for switching an LCD between display and touch modes, in which one or more drive, sense, and data lines in pixels of the display can be switched based on the mode. In some embodiments, the circuitry can include one or more switches configured to switch drive lines to receive stimulation signals, sense lines to transmit touch signals, and data lines to transmit residual data signals during the touch mode. In some embodiments, the circuitry can include one or more switches configured to switch drive lines and sense lines to receive common voltage signals and data lines to receive data signals during the display mode. The circuitry can advantageously be compactly disposed around the border of an LCD chip, thereby providing a thinner, smaller LCD chip. Power savings can also be realized by sharing portions of the circuitry in both touch and display modes.

DETAILED DESCRIPTION

In the following description of various embodiments, reference is made to the accompanying drawings in which it is shown by way of illustration specific embodiments which can be practiced. It is to be understood that other embodiments can be used and structural changes can be made without departing from the scope of the embodiments.

This relates to circuitry for switching an LCD between display and touch modes, in which drive, sense, and data lines in pixels of the display can be switched based on the mode. In some embodiments, the circuitry can include one or more switches configured to switch drive lines to receive stimulation signals, sense lines to transmit touch signals, and data lines to transmit residual data signals during the touch mode. In some embodiments, the circuitry can include one or more switches configured to switch drive lines and sense lines to receive common voltage signals and data lines to receive data signals during the display mode. The circuitry can advantageously be compactly disposed around the border of an LCD chip (or alternatively in an application specific integrated circuit (ASIC) separate from the LCD chip), thereby providing a thinner, smaller LCD chip. Power savings can also be realized by sharing portions of the circuitry in both touch and display modes.

The terms "drive line," "horizontal common voltage line," and "xVcom" can refer to the horizontal conductive lines of the LCD. In most cases, though not always, the term "drive line" can be used when referring to these conductive lines in the drive regions of the LCD because they can be used to transmit a stimulation signal to drive the drive regions.

The terms "sense line," "vertical common voltage line," and "yVcom" can refer to the vertical conductive lines of the LCD. In most cases, though not always, the term "sense line" can be used when referring to these conductive lines in the sense regions of the LCD because they can be used to transmit a touch signal to sense a touch or near touch on the display.

The term "subpixel" can refer to a red, green, or blue display component of the LCD, while the term "pixel" can refer to a combination of a red, a green, and a blue subpixel.

Although some embodiments may be described herein in terms of LCDs, it should be understood that embodiments are not so limited, but are generally applicable to any devices utilizing display and touch capabilities with circuitry to switch therebetween according to various embodiments. It is also to be understood that the switching circuitry can be incorporated into an LCD with an overlaying touch sensor panel, i.e., a touch screen, or into an LCD with a touch sensor panel integrated therein, i.e., an integrated touch screen.

Figure 1:
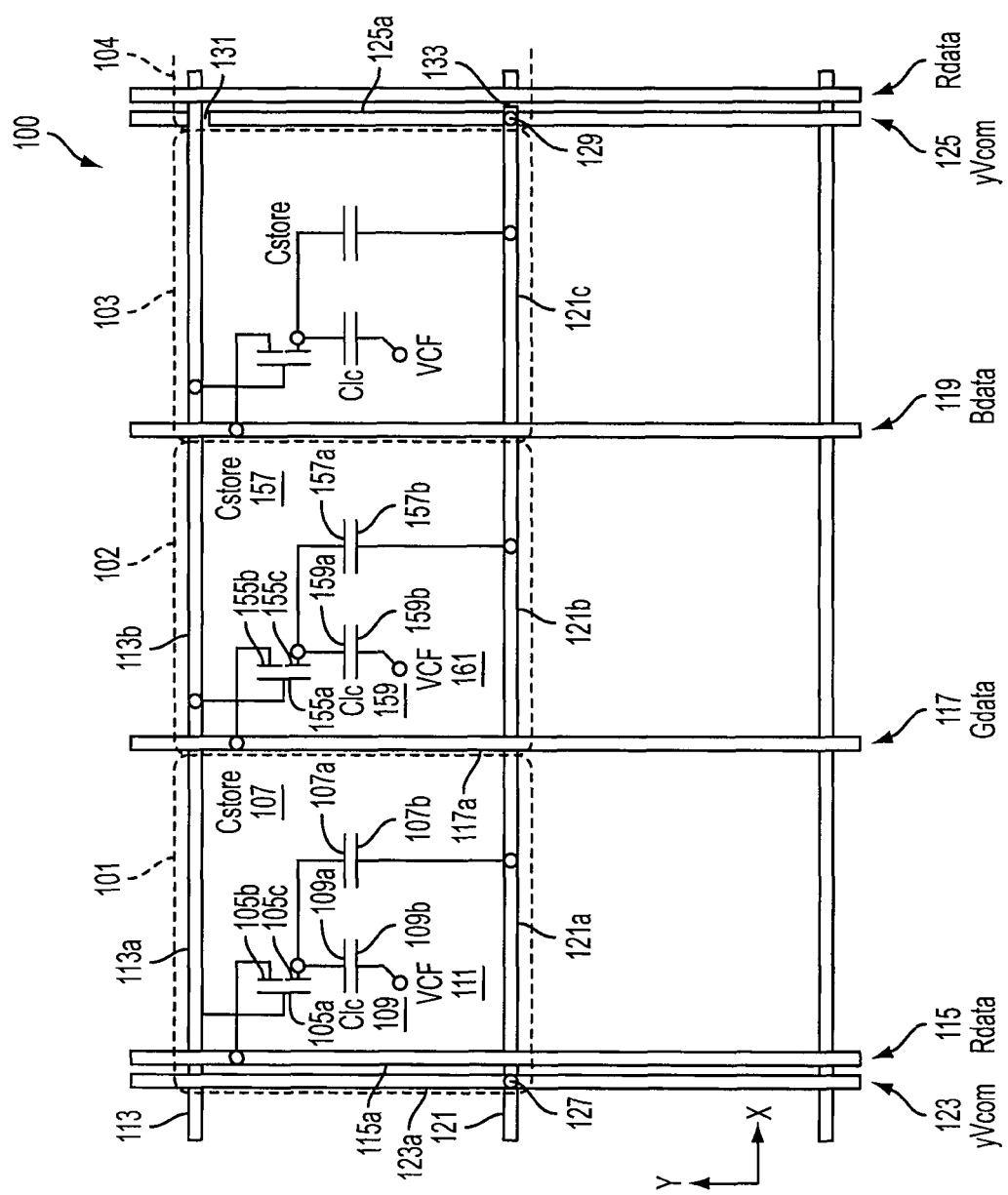
FIG. 1 illustrates a partial circuit diagram of exemplary pixels in an LCD having display and touch modes which can include circuitry for switching between the display and touch modes according to various embodiments.

FIG. 1 illustrates a partial circuit diagram of exemplary pixels of an LCD having display and touch modes which can include circuitry for switching between the modes according to various embodiments. In the example of FIG. 1, LCD 100 can include one or more LCD subpixels according to various embodiments. The subpixels of the LCD 100 can be configured such that they are capable of dual-functionality as both LCD subpixels and touch sensor elements. That is, the subpixels can include circuit elements, such as capacitive elements, electrodes, etc., that can operate as part of the LCD circuitry of the pixels and that can also operate as elements of touch sensing circuitry. In this way, LCD 100 can operate as an LCD with integrated touch sensing capability. FIG. 1 shows details of subpixels 101, 102, 103, and 104 of display 100. Note that each of the subpixels can represent either red (R), green (G) or blue (B), with the combination of all three R, G and B subpixels forming a single color pixel.

Subpixel 102 can include thin film transistor (TFT) 155 with gate 155a, source 155b, and drain 155c. Subpixel 102 can also include storage capacitor, Cst 157, with upper electrode 157a and lower electrode 157b, liquid crystal capacitor, Clc 159, with subpixel electrode 159a and common electrode 159b, and color filter voltage source, Vcf 161. If a subpixel is an in-plane-switching (IPS) device, Vcf can be, for example, a fringe field electrode connected to a common voltage line in parallel with Cst 157. If a subpixel does not utilize IPS, Vcf 151 can be, for example, an indium-tin-oxide (ITO) layer on the color filter glass. Subpixel 102 can also include a portion 117a of a data line for green (G) color data, Gdata line 117, and a portion 113b of gate line 113. Gate 155a can be connected to gate line portion 113b, and source 155b can be connected to Gdata line portion 117a. Upper electrode 157a of Cst 157 can be connected to drain 155c of TFT 155, and lower electrode 157b of Cst 157 can be connected to a portion 121b of a common voltage line that runs in the x-direction, xVcom 121. Subpixel electrode 159a of Clc 159 can be connected to drain 155c of TFT 155, and common electrode 159b of Clc 159 can connected to Vcf 151.

The circuit diagram of subpixel 103 can be identical to that of subpixel 102. However, as shown in FIG. 1, color data line 119 running through subpixel 103 can carry blue (B) color data. Subpixels 102 and 103 can be, for example, known LCD subpixels.

Similar to subpixels 102 and 103, subpixel 101 can include thin film transistor (TFT) 105 with gate 105a, source 105b, and drain 105c. Subpixel 101 can also include storage capacitor, Cst 107, with upper electrode 107a and lower electrode 107b, liquid crystal capacitor, Clc 109, with subpixel electrode 109a and common electrode 109b, and color filter voltage source, Vcf 111. Subpixel 101 can also include a portion 115a of a data line for red (R) color data, Rdata line 115, and a portion 113a of gate line 113. Gate 105a can be connected to gate line portion 113a, and source 105b can be connected to Rdata line portion 115a. Upper electrode 107a of Cst 107 can be connected to drain 105c of TFT 105, and lower electrode 107b of Cst 107 can be connected to a portion 121a of xVcom 121. Subpixel electrode 109a of Clc 109 can be connected to drain 105c of TFT 105, and common electrode 109b of Clc 109 can be connected to Vcf 111.

Unlike subpixels 102 and 103, subpixel 101 can also include a portion 123a of a common voltage line running in the y-direction, yVcom 123. In addition, subpixel 101 can include a connection 127 that connects portion 121a to portion 123a. Thus, connection 127 can connect xVcom 121 and yVcom 123.

Subpixel 104 (only partially shown in FIG. 1) can be similar to subpixel 101, except that a portion 125a of a yVcom 125 can have a break (open) 131, and a portion 121b of xVcom 121 can have a break 133.

As can be seen in FIG. 1, the lower electrodes of storage capacitors of subpixels 101, 102, and 103 can be connected together by xVcom 121. This can be, for example, a type of connection in known LCD panels and, when used in conjunction with known gate lines, data lines, and transistors, can allow subpixels to be addressed. The addition of vertical common voltage lines along with connections to the horizontal common voltage lines can allow grouping of subpixels in both the x-direction and y-direction, as described in further detail below. For example, yVcom 123 and connection 127 to xVcom 121 can allow the storage capacitors of subpixels 101, 102, and 103 to be connected to storage capacitors of subpixels that are above and below subpixels 101, 102, 103 (the subpixels above and below are not shown). For example, the subpixels immediately above subpixels 101, 102, and 103 can have the same configurations as subpixels 101, 102, and 103, respectively. In this case, the storage capacitors of the subpixels immediately above subpixels 101, 102, and 103 would be connected to the storage capacitors of subpixels 101, 102, and 103.

In general, an LCD panel can be configured such that the storage capacitors of all subpixels in the panel can be connected together, for example, through at least one vertical common voltage line with connections to horizontal common voltage lines. Another LCD panel can be configured such that different groups of subpixels can be connected together to form separate regions of connected-together storage capacitors.

One way to create separate regions can be by forming breaks (opens) in the horizontal and/or vertical common lines. For example, yVcom 125 of LCD 100 can have break 131, which can allow subpixels above the break to be isolated from subpixels below the break. Likewise, xVcom 121 can have break 133, which can allow subpixels to the right of the break to be isolated from subpixels to the left of the break.

Touch regions of an LCD can be formed by groups of pixels (each pixel including a red, green, and blue subpixel as in FIG. 1) electrically connected together to form drive regions for driving stimulation signals, to form ground regions for alleviating dielectric effects of the liquid crystals in the display, and to form sense regions for sensing a touch or near touch of an object, such as a finger, on the display, during touch mode.

Figure 2:
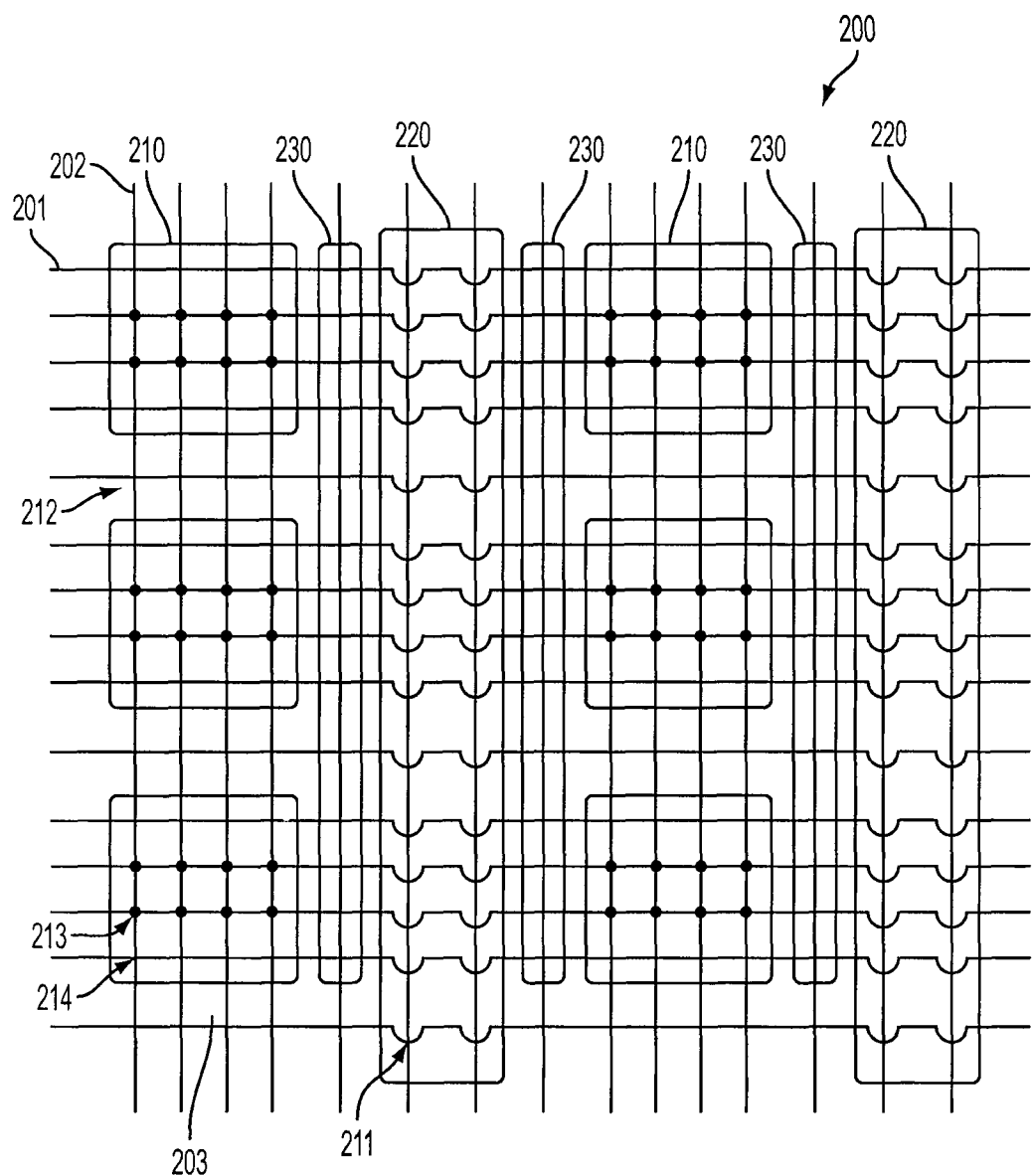
FIG. 2 illustrates an exemplary LCD having display and touch modes in which touch regions, such as drive, ground, and sense regions, formed by LCD pixels can have circuitry to switch between the display and touch modes according to various embodiments.

FIG. 2 illustrates an exemplary LCD having display and touch modes in which touch regions, such as drive, ground, and sense regions, formed by LCD pixels can have circuitry to switch between the modes according to various embodiments. In the example of FIG. 2, LCD 200 can have touch regions, which can include drive regions 210, sense regions 220, and ground regions 230. The drive regions 210, the sense regions 220, and the ground regions 230 can include groups of pixels 203, which can be used to display graphics and data in the display mode and can be used to sense a touch or near touch in the touch mode. For simplicity, each pixel 203 is shown as a single block with a vertical common voltage line yVcom 202 and a horizontal common voltage line xVcom 201, where each single pixel block can represent a set of red, green, and blue subpixels each having a data line, as shown in FIG. 1.

A drive region 210 can be formed by connecting at least one vertical common voltage line yVcom 202 of a pixel 203 with at least one horizontal common voltage line xVcom 201 of the pixel, thereby forming a drive region having a row of pixels. A drive plate (e.g., an ITO plate) can be used to cover the drive region and connect to the vertical and horizontal common voltage lines so as to group the pixels together to form the drive region for touch mode. Generally, a drive region can be larger than a single row of pixels, comparable to the size of a finger tip, for example, in order to effectively receive a touch or near touch on the LCD. For example, a drive region can be formed by connecting vertical common voltage lines yVcom with horizontal common voltage lines xVcom, thereby forming a drive region containing a matrix of pixels. In some embodiments, drive regions proximate to each other can share horizontal common voltage lines xVcom as drive lines, which can be used to stimulate the drive regions with stimulation signals. In some embodiments, drive regions proximate to each other can share vertical common voltage lines yVcom with breaks 212 in the lines between the drive regions in order to minimize the lines causing parasitic capacitance that could interfere with the received touch or near touch. Optionally and alternatively, the vertical common voltage line breaks can be omitted and the lines shared in their entirety among the drive regions.

In some embodiments, some of the xVcom lines 201 in the drive regions 210 can be connected to the drive plate at connections 213, while others of the xVcom lines 201 in the drive regions 210 can be unconnected from the drive plate at positions 214. The connected xVcom lines 201 can transmit a positive-phase stimulation signal, while the unconnected xVcom lines 201 can transmit a negative-phase stimulation signal or vice versa. This can be done to reduce the parasitic capacitance that the xVcom lines 201 can create as they cross under the sense regions 220.

A sense region 220 can be formed by at least one vertical common voltage line yVcom 202 of a pixel, thereby forming a sense region having a column of pixels. A sense plate (e.g., an ITO plate) can be used to cover the sense region and connect to the vertical common voltage line so as to group the pixels together to form the sense region for touch mode. Generally, a sense region can be larger than a single column of pixels in order to effectively sense a received touch or near touch on the touch sensitive device. For example, a sense region can be formed by vertical common voltage lines yVcom, thereby forming a sense region containing a matrix of pixels. In some embodiments, a sense region can include vertical common voltage lines yVcom as sense lines, which can transmit a touch signal based on a touch or near touch. In the sense region, the vertical common voltage lines yVcom can be unconnected from and can cross over the horizontal common voltage lines xVcom at positions 211 to form a mutual capacitance structure for touch sensing. This cross over of yVcom and xVcom can also form additional parasitic capacitance between the sense and drive ITO regions that can be minimized.

A ground region 230 can be formed by connecting at least one vertical common voltage line yVcom 202 of a pixel with at least one horizontal common voltage line xVcom 201 of the pixel, thereby forming a ground region of a matrix of pixels. An actual or virtual ground can be used to ground the pixels in the ground region 230. This can alleviate the dielectric effects of the liquid crystals on the drive and sense regions of the LCD.

In operation during touch mode, the horizontal common voltage lines xVcom 201 can transmit stimulation signals to stimulate the drive regions 210 to form electric field lines between the stimulated drive regions and adjacent sense regions 220. When an object, such as a finger, touches or near touches a stimulated drive region 210, the object can affect some of the electric field lines extending to the adjacent sense regions 220, thereby reducing the amount of charge coupled to these adjacent sense regions. This reduction in charge can be sensed by the sense regions 220 as an "image" of touch. This touch image can be transmitted along the vertical common voltage lines yVcom 202 of the sense regions 220 to touch circuitry for further processing.

The drive regions of FIG. 2 are shown as rectangles connected in rows across the LCD and the sense regions and ground regions of FIG. 2 are shown as rectangles extending the vertical length of the LCD. However, the drive, sense, and ground regions are not limited to the shapes, orientations, and positions shown, but can include any suitable configurations according to various embodiments. It is to be understood that the pixels used to form the touch regions are not limited to those described above, but can be any suitable pixels having display and touch capabilities according to various embodiments.

Because the LCD pixels can be used for both display and touch, circuitry to switch between the two can be implemented around the borders of the LCD chip. FIGS. 3 through 9 illustrate exemplary circuits for switching the LCD between display and touch modes. For simplicity, some standard LCD circuitry for displaying graphics and data in display mode has been omitted from FIGS. 3 through 9. It is to be understood, however, that this circuitry can be included in the LCD according to various embodiments.

Figure 3A:
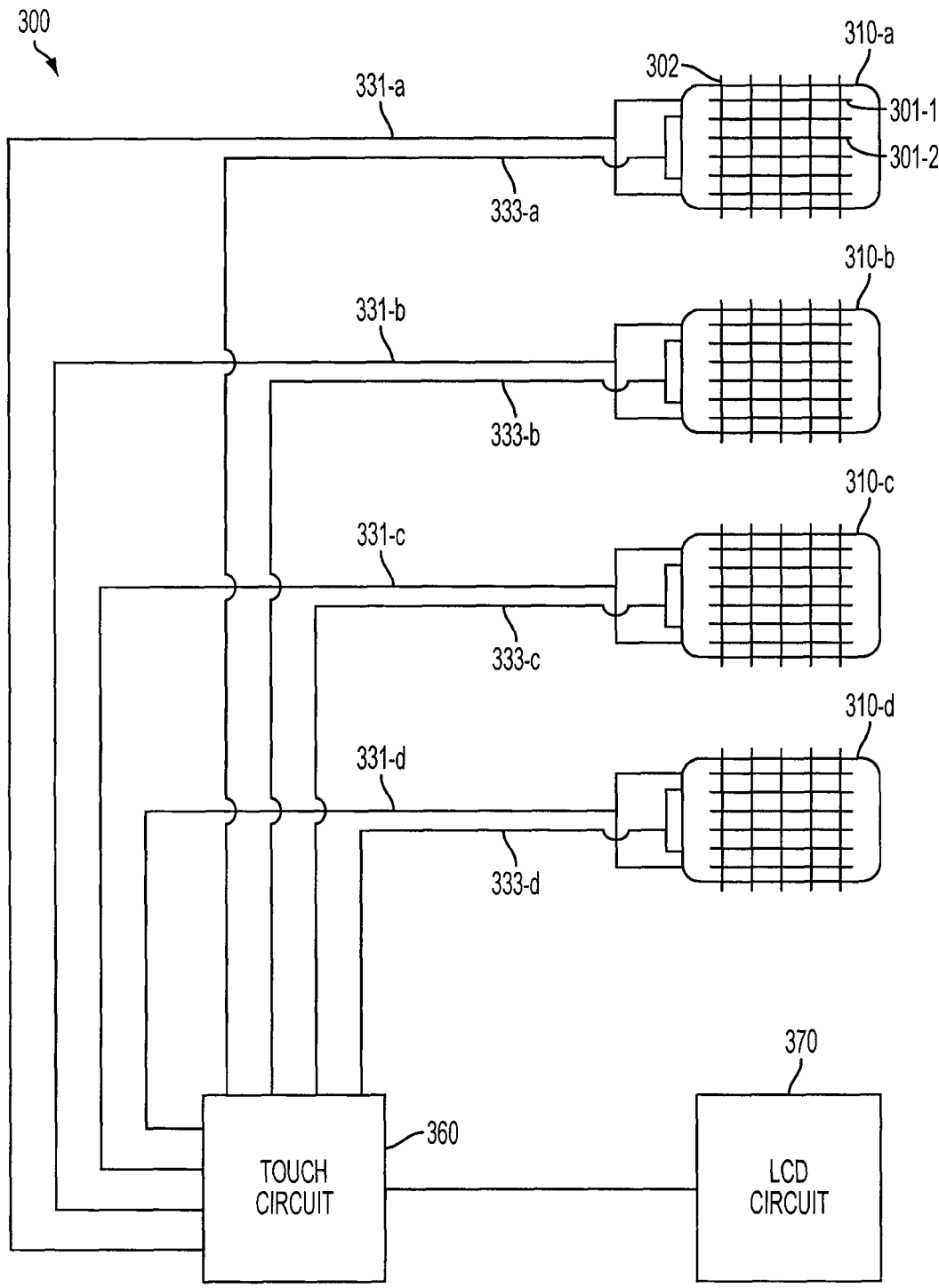
FIGS. 3a and 3b illustrate an exemplary circuit that can switch drive lines in a drive region of an LCD between display and touch modes according to various embodiments.
Figure 3B:
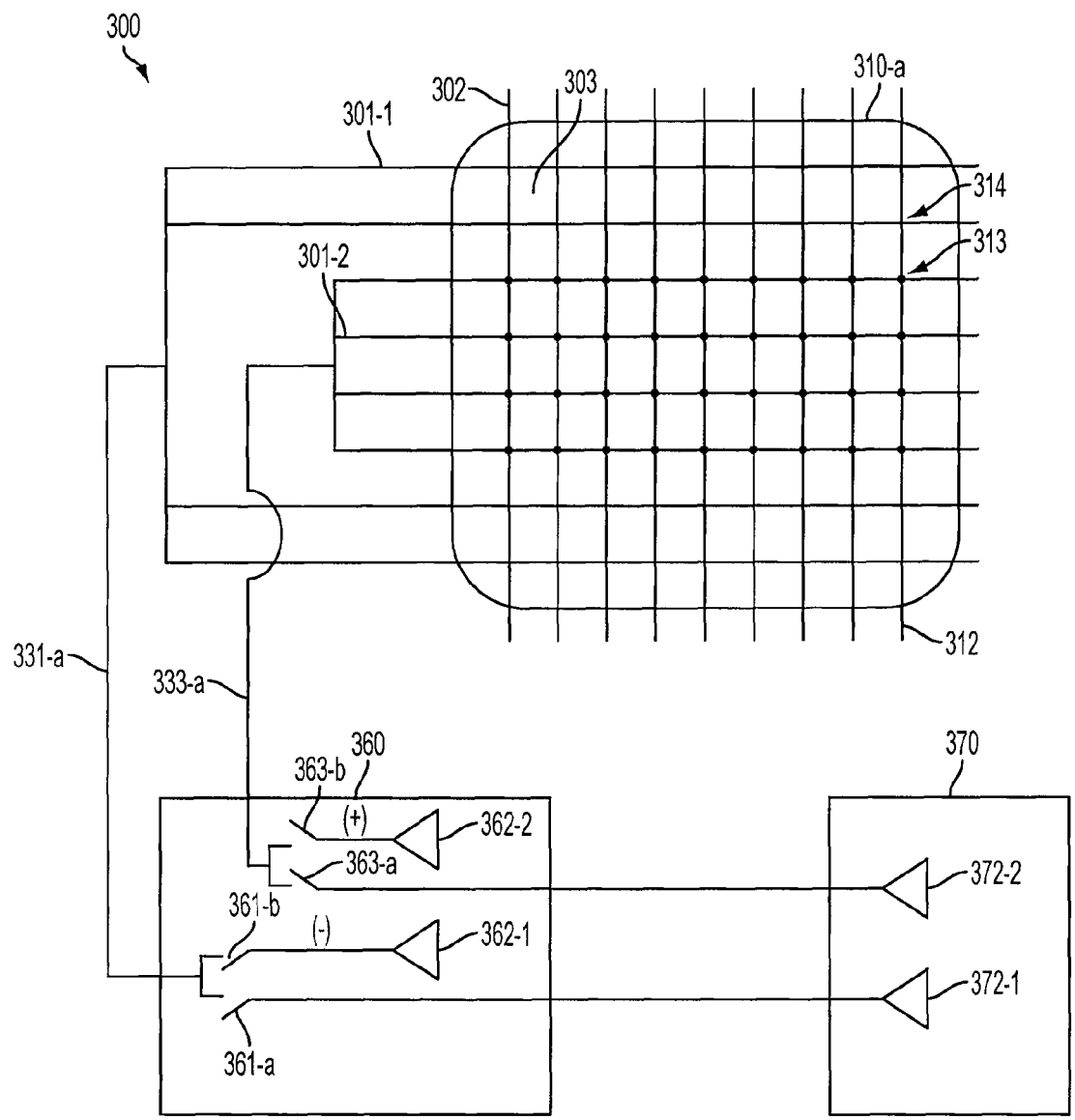

FIGS. 3a and 3b illustrate an exemplary circuit that can switch drive lines in a drive region of an LCD between display and touch modes according to various embodiments. In the example of FIG. 3a, circuit 300 can have drive regions 310 having drive lines 301-1 that are driven with a negative-phase voltage and drive lines 301-2 that are driven with a positive-phase voltage, as described previously. The drive regions 310 can also have vertical common voltage lines yVcom 302. The drive lines 301-1 can be connected to touch circuit 360 via conductive traces 331 to receive the negative-phase stimulation signals for stimulating the corresponding drive regions 310. Similarly, the drive lines 301-2 can be connected to the touch circuit 360 via conductive traces 333 to receive the positive-phase stimulation signals for stimulating the corresponding drive regions 310. LCD circuit 370 can be connected to the drive regions 310 via its connection to the touch circuit 360. The conductive traces 331 and 333 can be used in both display and touch modes.

Table 1 below shows exemplary stimulation signals that can be transmitted during a drive period involving steps 1-4 along the conductive traces 331, 333 to the drive lines 301 of the drive regions 310 to stimulate the regions during touch mode.

TABLE 1

|  | Step 1 | Step 2 | Step 3 | Step 4 |
| --- | --- | --- | --- | --- |
| Region 1 | + | + | + | + |
|  | − | − | − | − |
| Region 2 | + | + | − | − |
|  | − | − | + | + |
| Region 3 | + | − | − | + |
|  | − | + | + | − |
| Region 4 | + | − | + | − |
|  | − | + | − | + |

According to the table, during step 1 of the drive period, conductive trace 333-a can transmit a positive-phase (+) stimulation signal to drive lines 301-2 of drive region 310-a, while conductive trace 331-a can transmit a negative-phase (−) stimulation signal to drive lines 301-1 of the drive region. Similarly, conductive traces 333-b, 333-c, 333-d can transmit a positive-phase (+) stimulation signal to drive lines 301-2 of their respective drive regions 310-b, 310-c, 310-d, while conductive traces 331-b, 331-c, 331-d can transmit a negative-phase (−) stimulation signal to drive lines 301-1 of the respective drive regions.

During step 2 of the drive period, conductive traces 333-a, 333-b can transmit a positive-phase (+) stimulation signal to drive lines 301-2 of their respective drive regions 310-a, 310-b, while conductive traces 331-a, 331-b can transmit a negative-phase (−) stimulation signal to drive lines 301-1 of the respective drive regions. Conductive traces 333-c, 333-d can transmit a negative-phase (−) stimulation signal to drive lines 301-2 of their respective drive regions 310-c, 310-d, while conductive traces 331-c, 331-d can transmit a positive-phase (+) stimulation signal to drive lines 301-1 of the respective drive regions.

Steps 3 and 4 of the drive period can be executed similarly.

FIG. 3b shows the switching circuit in more detail for one of the drive regions of the LCD. In the example of FIG. 3b, drive region 310-a can have drive lines 301-1 which can be tied together to conductive trace 331-a. The drive region 310-a can also have drive lines 301-2 which can be tied together to conductive trace 333-a. As described previously, the drive lines 301-1 can be unconnected 314 to the drive plate of the drive region 310-a, while the drive lines 301-2 can be connected 313 to the drive region in order to reduce parasitic capacitance of the drive lines with respect to the signal capacitance. The vertical common voltage lines 302 can have breaks 312 between proximate drive regions 310 in order to reduce parasitic capacitance of the lines with the drive plate.

In operation, during touch mode, drive lines 301-1 can be switched via switch 361-b in the touch circuit 360 to connect to negative-phase voltage source 362-1, which can transmit the negative-phase stimulation signals along conductive trace 331-a to stimulate the drive region 310-a. Examples of the switch can include a transistor, a solenoid, a multiplexer, and the like. Similarly, drive lines 301-2 can be switched via switch 363-b in the touch circuit 360 to connect to positive-phase voltage source 362-2, which can transmit the positive-phase stimulation signals along conductive trace 333-a to stimulate the drive region 310-a. As a result, the drive region 310-a can generate electric field lines which can be used to sense a touch or near touch in the drive region.

During display mode, the drive lines 301-1 can be switched via switch 361-a in the touch circuit 360 to connect to a common voltage source 372-1 in the LCD circuit 370. Similarly, drive lines 301-2 can be switched via switch 363-a in the touch circuit 360 to connect to a common voltage source 372-2 in the LCD circuit 370. As a result, pixels 303 in the drive region can receive a common voltage signal which can be used to help display graphics and data in the drive region.

Although the drive lines 301-1 are shown as transmitting a negative-phase stimulation signal and the drive lines 301-2 are shown as transmitting a positive-phase stimulation signal, the reverse can also occur depending on the needs of the LCD.

Figure 4A:
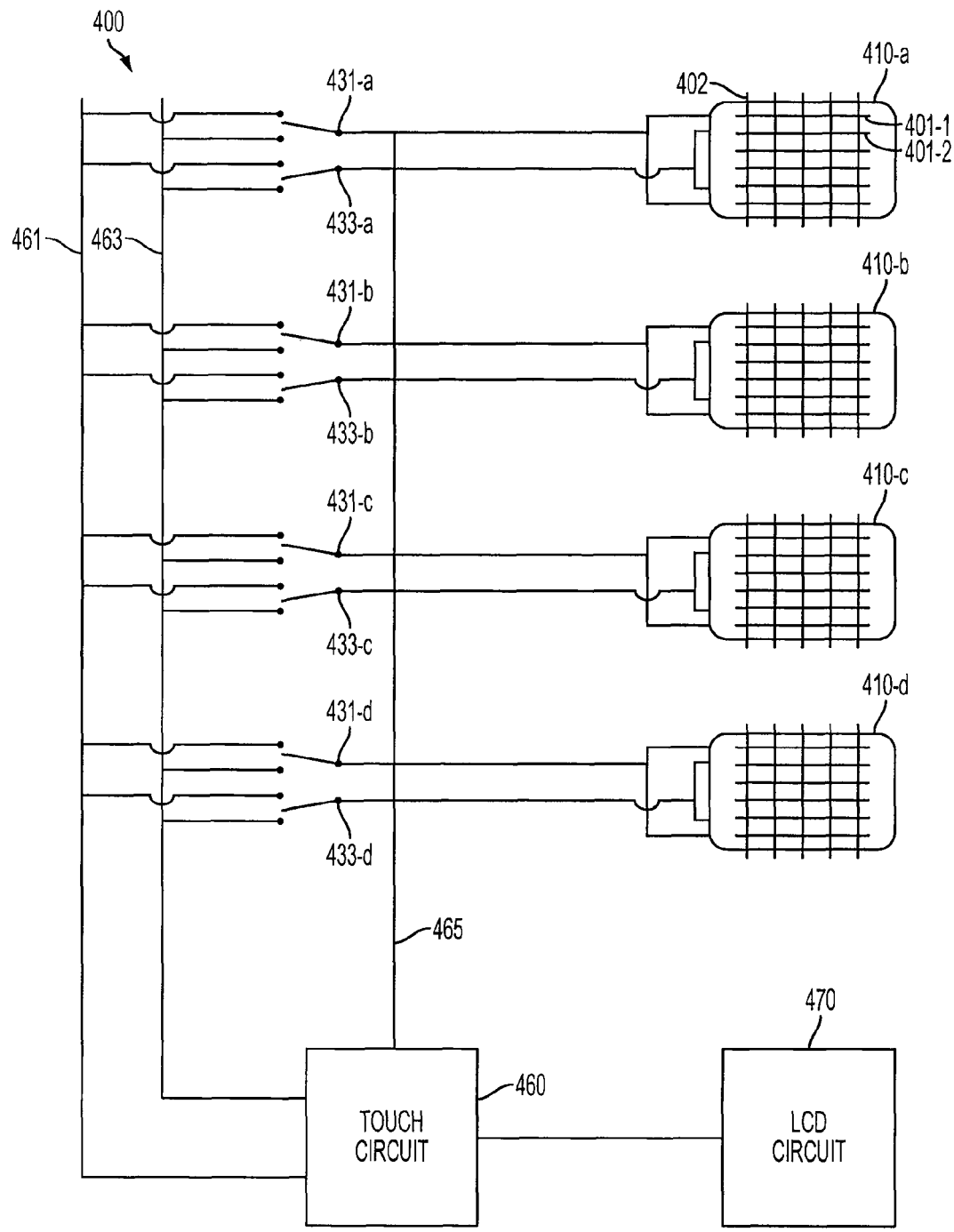
FIGS. 4a and 4b illustrate another exemplary circuit that can switch drive lines in a drive region of an LCD between the display and touch modes according to various embodiments.
Figure 4B:
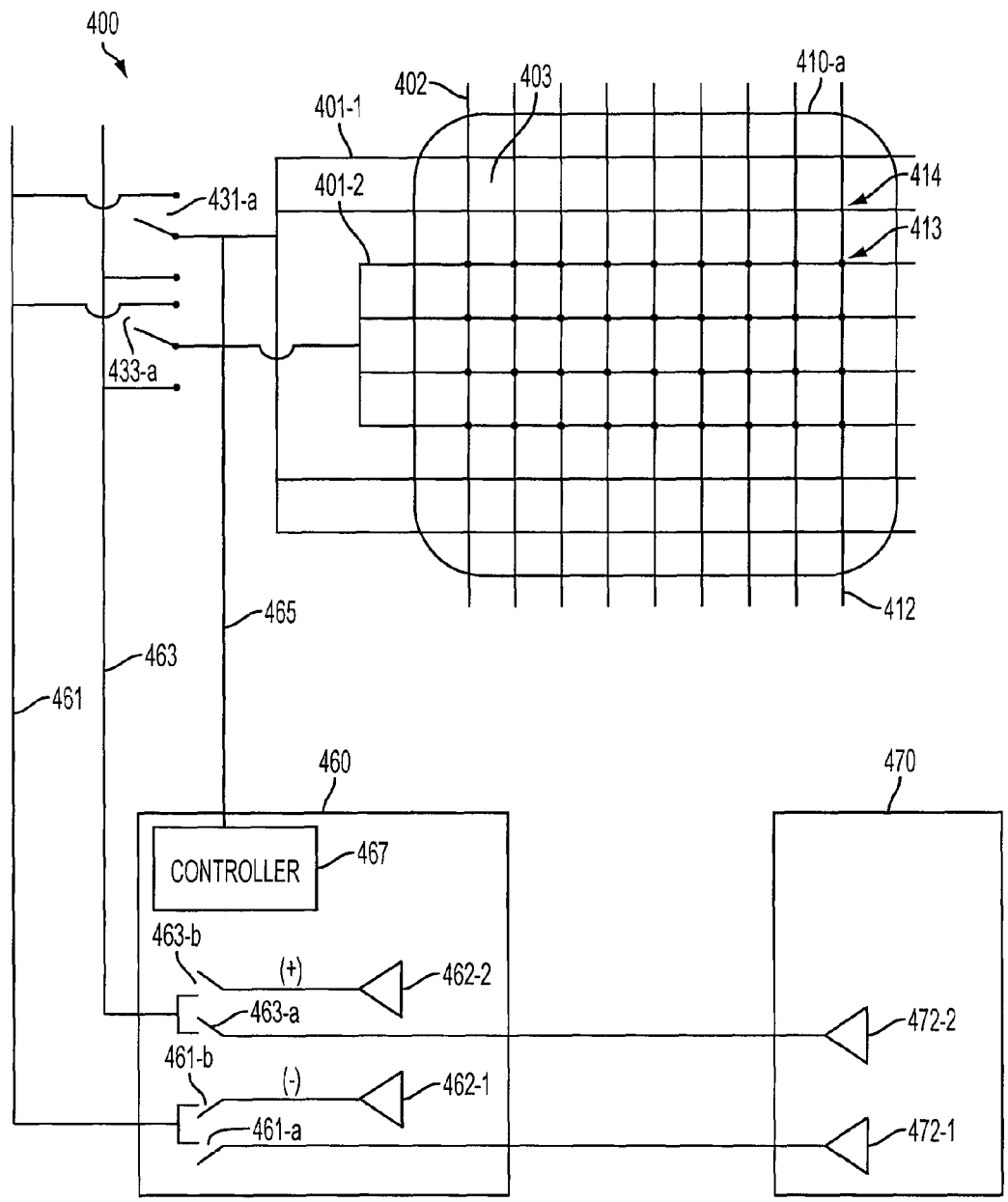

FIGS. 4a and 4b illustrate another exemplary circuit that can switch drive lines in a drive region of an LCD between display and touch modes according to various embodiments. In the example of FIG. 4a, circuit 400 can have display regions 410 like those of FIG. 3a. Unlike the example of FIGS. 3a and 3b, a single conductive trace 461 can be switchably used by multiple drive regions 410 to connect their drive lines 401-1 to either a negative-phase voltage source or a positive-phase voltage source in touch circuit 460, rather than each drive region having its own such conductive trace to connect to only the negative-phase voltage source, as in conductive traces 331 of FIGS. 3a and 3b. A single conductive trace 463 can also be switchably used by multiple drive regions 410 to connect their drive lines 401-2 to either a positive-phase voltage source or a negative-phase voltage source in touch circuit 460, rather than each drive region having its own such conductive trace to connect to only the positive-phase voltage source, as in conductive traces 333 of FIGS. 3a and 3b. The drive lines 401-1 can be tied together to their corresponding switch 431, which can switch between the conductive trace 461 to connect to the negative-phase voltage source or the conductive trace 463 to connect to the positive-phase voltage source. Similarly, the drive lines 401-2 can be tied together to their corresponding switch 433, which can switch between the conductive trace 461 and the conductive trace 463. LCD circuit 470 can connect to the drive regions 410 via the touch circuit 460.

FIG. 4b shows the switching circuit in more detail for one of the drive regions of the LCD. In the example of FIG. 4b, circuit 400 can have display region 410-a like that of FIG. 3b. However, unlike the example of FIGS. 3a and 3b, drive lines 401-1 can be tied together to switch 431-a, which can switch to conductive trace 461 to connect to negative-phase voltage source 462-1, or which can switch to conductive trace 463 to connect to positive-phase voltage source 462-2. Similarly, drive lines 401-2 can be tied together to switch 433-a, which can switch to conductive trace 461 to connect to negative-phase voltage source 462-1, or which can switch to conductive trace 463 to connect to positive-phase voltage source 462-2.

In operation, during touch mode, drive lines 401-1 can be switched via switch 431-*a* to connect to conductive trace 461, which can be switched via switch 461-*b* in the touch circuit 460 to connect to negative-phase voltage source 462-1, which can transmit the negative-phase stimulation signals along conductive trace 461 to stimulate the drive region 410-*a*. Alternatively, drive lines 401-1 can be switched via switch 431-*a* to connect to conductive trace 463, which can be switched via switch 463-*b* in the touch circuit 460 to connect to positive-phase voltage source 462-2, which can transmit the positive-phase stimulation signals along conductive trace 463 to stimulate the drive region 410-*a*. Similarly, drive lines 401-2 can be switched via switch 433-*a* to connect to conductive trace 463, which can be switched via switch 463-*b* in the touch circuit 460 to connect to positive-phase voltage source 462-2, which can transmit the positive-phase stimulation signals along conductive trace 463 to stimulate the drive region 410-*a*. Alternatively, drive lines 401-2 can be switched via switch 433-*a* to connect to conductive trace 461, which can be switched via switch 461-*b* in the touch circuit 460 to connect to negative-phase voltage source 462-1, which can transmit the negative-phase stimulation signals along conductive trace 461 to stimulate the drive region 410-*a*. As a result, the drive region 410-*a* can generate electric field lines which can be used to sense a touch or near touch in the drive region.

Serial logic switch controller 467 in the touch circuit 460 can transmit control signals via control line 465 to switches 431-*a*, 433-*a* to cause the switches to switch to the appropriate conductive trace 461, 463 in order to transmit the stimulation signals, such as shown in Table 1 above. For example, during the first step of operation shown in Table 1, the drive lines 401-2 can transmit a positive-phase voltage; hence, the drive lines 401-1 can transmit a negative-phase voltage. Therefore, the switch controller 467 can transmit control signals via control line 465 to switch 433-*a* to conductive trace 463 and to switch 431-*a* to conductive trace 461.

During display mode, the drive lines 401-1 can be switched via switch 431-*a* to conductive trace 461 and via switch 461-*a* in the touch circuit 460 to connect to a common voltage source 472-1 in the LCD circuit 470. Alternatively, the drive lines 401-1 can be switched via switch 431-*a* to conductive trace 463 and via switch 463-*a* in the touch circuit 460 to connect to a common voltage source 472-2 in the LCD circuit 470. Similarly, drive lines 401-2 can be switched via switch 433-*a* to conductive trace 463 and via switch 463-*a* in the touch circuit 460 to connect to a common voltage source 472-2 in the LCD circuit 470. Alternatively, the drive lines 401-2 can be switched via switch 433-*a* to conductive trace 461 and via switch 461-*a* in the touch circuit 460 to connect to the common voltage source 472-1 in the LCD circuit 470. As a result, pixels 403 in the drive region can receive a common voltage signal which can be used to help display graphics and data in the drive region.

Although the switching circuits of FIGS. 3 and 4 are shown as being formed on the left border of the LCD, they are not so limited. Rather, the switching circuits can be formed either on the right border or split between both left and right borders of the LCD depending on the LCD chip area. The switching circuits can also be formed so as to be disposed in close proximity to the drive lines to provide compactness on the LCD chip area.

Figure 5A:
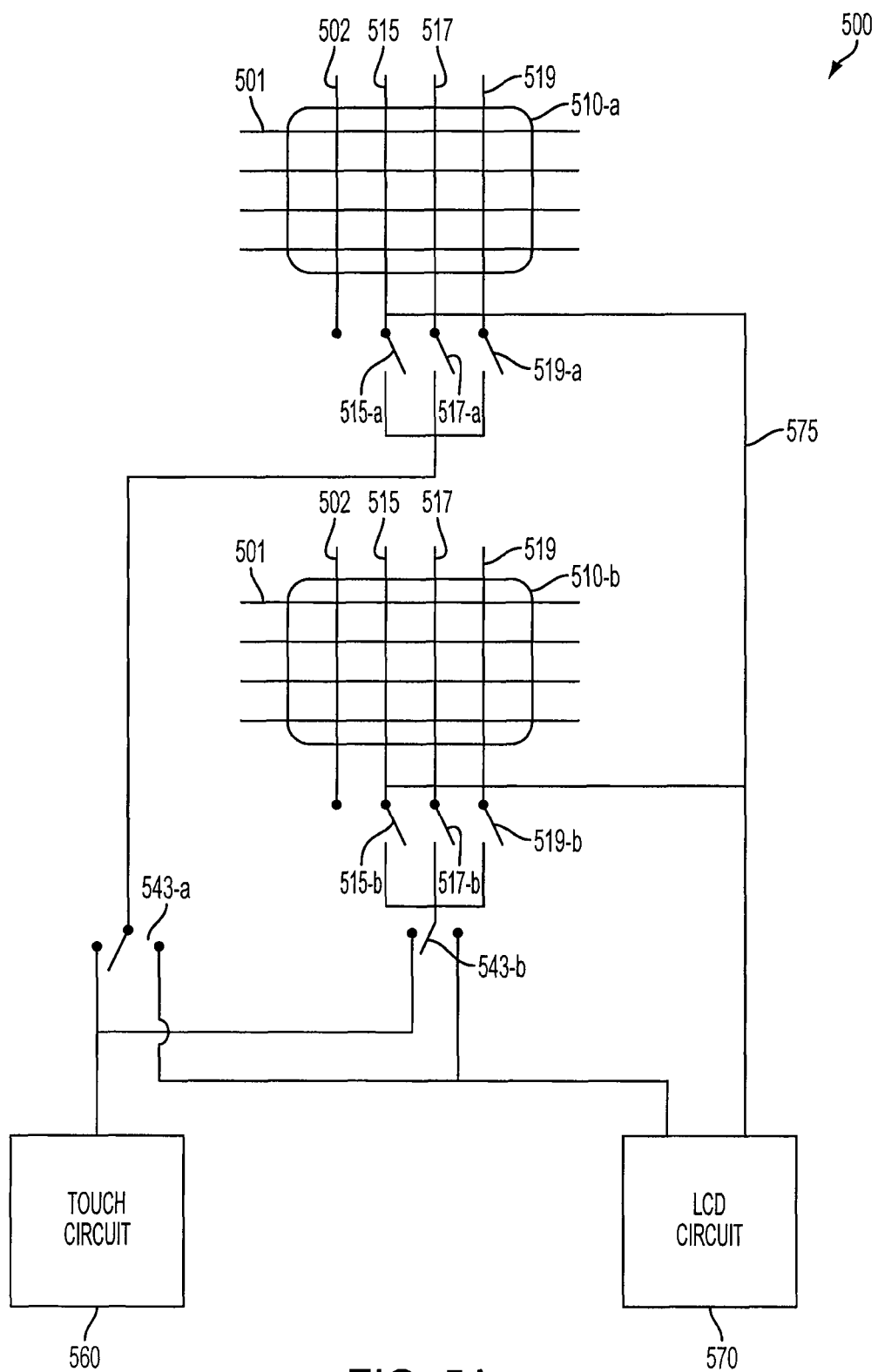
FIGS. 5a and 5b illustrate an exemplary circuit that can switch data lines in a drive region of an LCD between display and touch modes according to various embodiments.
Figure 5B:
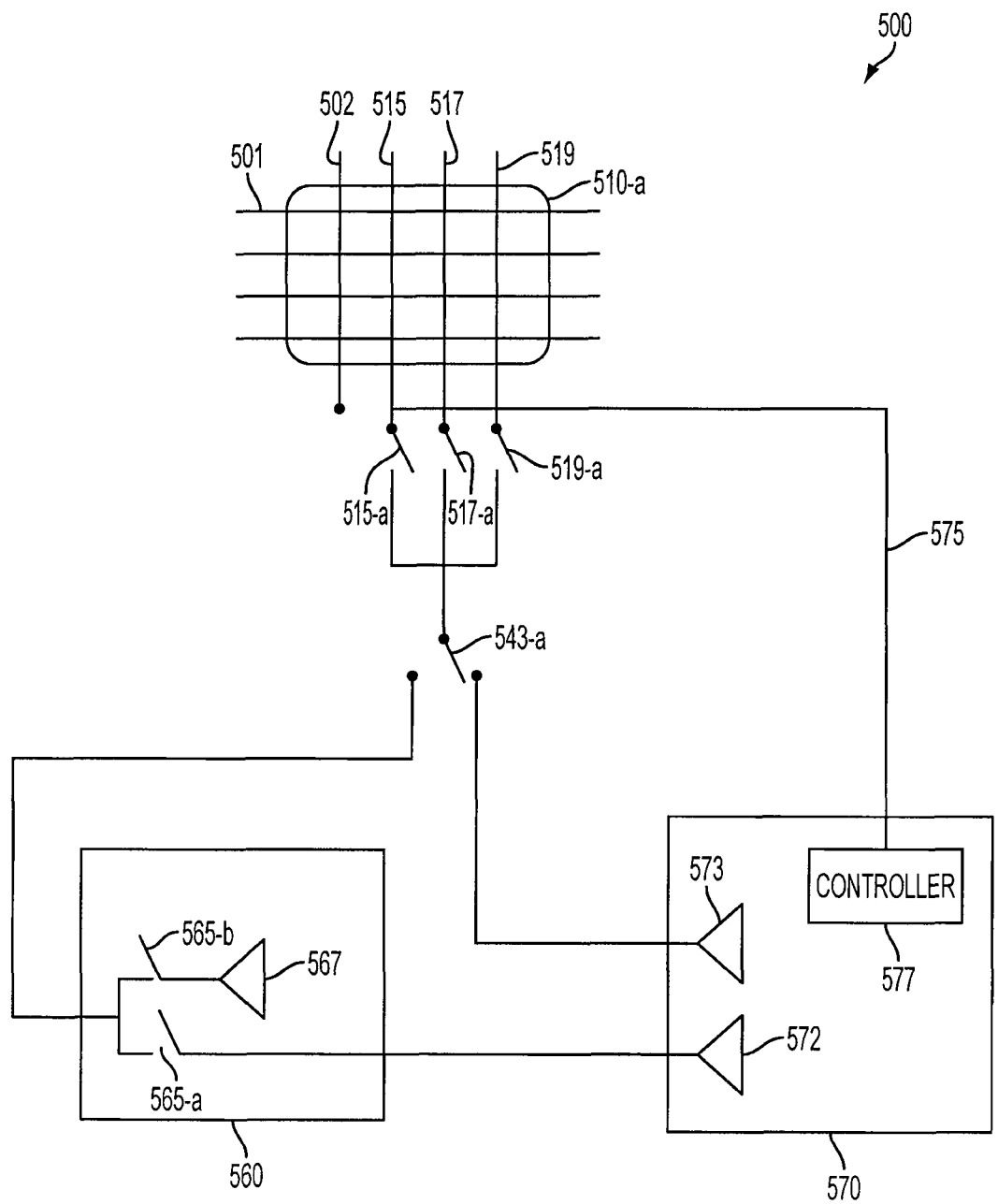

FIGS. 5*a* and 5*b* illustrate an exemplary circuit that can switch data lines in a drive region of an LCD between display and touch modes according to various embodiments. In the example of FIG. 5*a*, circuit 500 can include drive regions 510 having vertical common voltage lines yVcom 502 and red data lines 515, green data lines 517, and blue data lines 519. The drive regions 510 can also have drive lines 501, as described previously. The vertical common voltage lines 502 can have breaks between proximate drive regions 510 and terminate unconnected. The data lines 515, 517, 519 can be connected via respective switches 515, 517, 519 to switch 543, which can connect the data lines to either touch circuit 560 during touch mode or to LCD circuit 570 during display mode.

FIG. 5*b* shows the switching circuit in more detail for a drive region of the LCD. In the example of FIG. 5*b*, drive region 510-*a* can include vertical common voltage lines yVcom 502 and red data lines 515, green data lines 517, and blue data lines 519. For simplicity, only one line is shown for each of yVcom, red, green, and blue. However, it is to be understood that multiple lines can be included in drive regions. The vertical common voltage line 502 can terminate unconnected. The red data line 515, the green data line 517, and the blue data line 519 can tie together via their respective switches 515-*a*, 517-*a*, 519-*a* to connect to switch 543-*a*. The data lines can connect via switch 543-*a* to either the touch circuit 560 or the LCD circuit 570.

In operation, during touch mode, red, green, and blue data lines 515, 517, 519 can be switched via their respective switches 515-*a*, 517-*a*, 519-*a* to tie together to connect to switch 543-*a*, which can be switched to connect to the touch circuit 560. In the touch circuit 560, switch 565-*b* can connect the data lines 515, 517, 519 to a common voltage source 567. Alternatively, in the touch circuit 560, switch 565-*a* can connect the data lines 515, 517, 519 to a common voltage source 572 in the LCD circuit 570.

During display mode, red, green, and blue data lines 515, 517, 519 can be switched via their respective switches 515-*a*, 517-*a*, 519-*a* to tie together to connect to switch 543-*a*, which can be switched to connect to LCD data driver 573, which can send data signals along the data lines for display.

Switch controller 577 in the LCD circuit 570 can transmit control signals via control line 575 to switches 515-*a*, 517-*a*, 519-*a* to cause the switches to close during touch and/or display operation.

Figure 6A:
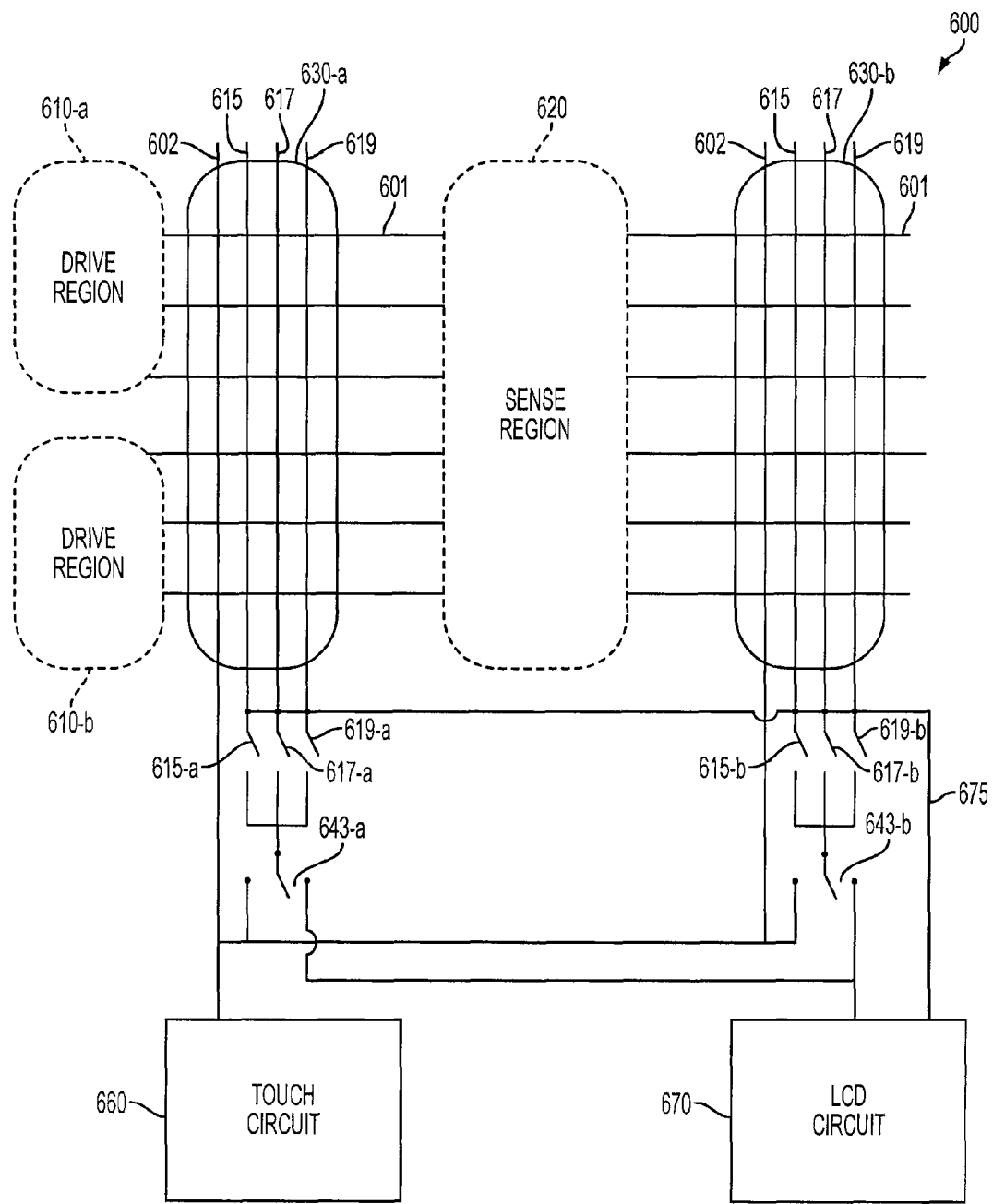
FIGS. 6a and 6b illustrate an exemplary circuit that can switch data lines in a ground region of an LCD between display and touch modes according to various embodiments.
Figure 6B:
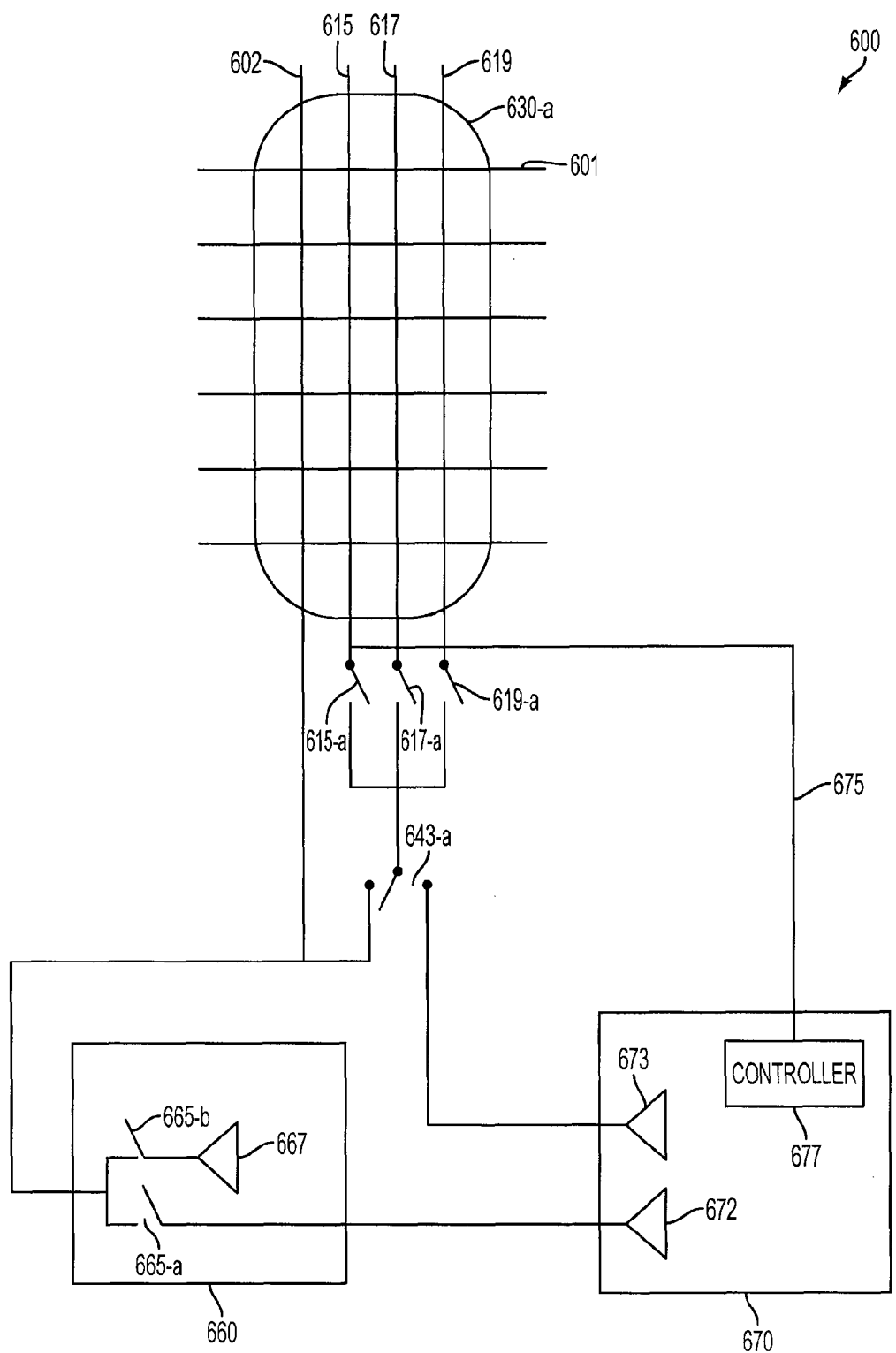

FIGS. 6*a* and 6*b* illustrate an exemplary circuit that can switch data lines in a ground region of an LCD between display and touch modes according to various embodiments. In the example of FIG. 6*a*, circuit 600 can include ground regions 630 disposed between drive regions 610 and sense regions 620. As described previously, the ground regions 630 can alleviate the dielectric effects of the liquid crystals in the LCD. Each ground region 630 can be one or more LCD pixels wide, depending on the needs of the LCD. In this example, the ground regions 630 can include vertical common voltage lines yVcom 602, red data lines 615, green data lines 617, and blue data lines 619. The ground regions 630 can also include drive lines 601, which can be electrically connected to the yVcom lines 602. The vertical common voltage lines 602 can connect to the touch circuit 660. The data lines 615, 617, 619 can be connected via respective switches 615, 617, 619 to switch 643, which can connect the data lines to either touch circuit 660 during touch mode or to LCD circuit 670 during display mode.

FIG. 6*b* shows the switching circuit in more detail for a ground region of the LCD. In the example of FIG. 6*b*, ground region 630-*a* can having vertical common voltage lines yVcom 602, red, green, and blue data lines 615, 617, 619, and drive lines 601. For simplicity, only one line is shown for each of yVcom, red, green, and blue. However, it is to be understood that multiple lines can be included in the ground regions. The vertical common voltage line 602 can connect to the touch circuit 660. The red data line 615, the green data line 617, and the blue data line 619 can tie together via their respective switches 615-a, 617-a, 619-a to connect to switch 643-a. The data lines can connect via switch 643-a to either the touch circuit 660 or the LCD circuit 670.

In operation, during touch mode, red, green, and blue data lines 615, 617, 619 can be switched via their respective switches 615-a, 617-a, 619-a to tie together to connect to switch 643-a, which can be switched to connect to the touch circuit 660. After switch 643-a, the data lines 615, 617, 619 can tie together with the yVcom line 602 to go to the touch circuit 660. In the touch circuit 660, switch 665-b can connect the yVcom line 620 and the data lines 615, 617, 619 to a common voltage source 667. Alternatively, in the touch circuit 660, switch 665-a can connect the yVcom line 602 and the data lines 615, 617, 619 to a common voltage source 672 in the LCD circuit 670.

During display mode, red, green, and blue data lines 615, 617, 619 can be switched via their respective switches 615-a, 617-a, 619-a to tie together to connect to switch 643-a, which can be switched to connect to LCD data driver 673, which can send data signals along the data lines for display. The yVcom line 602 can connect via switch 665-a to the common voltage source 672 in the LCD circuit 670 or via switch 665-b to the common voltage source 667 in the touch circuit 660.

Switch controller 677 in the LCD circuit 670 can transmit control signals via control line 675 to switches 615-a, 617-a, 619-a to cause the switches to close during touch and/or display operation.

Figure 7:
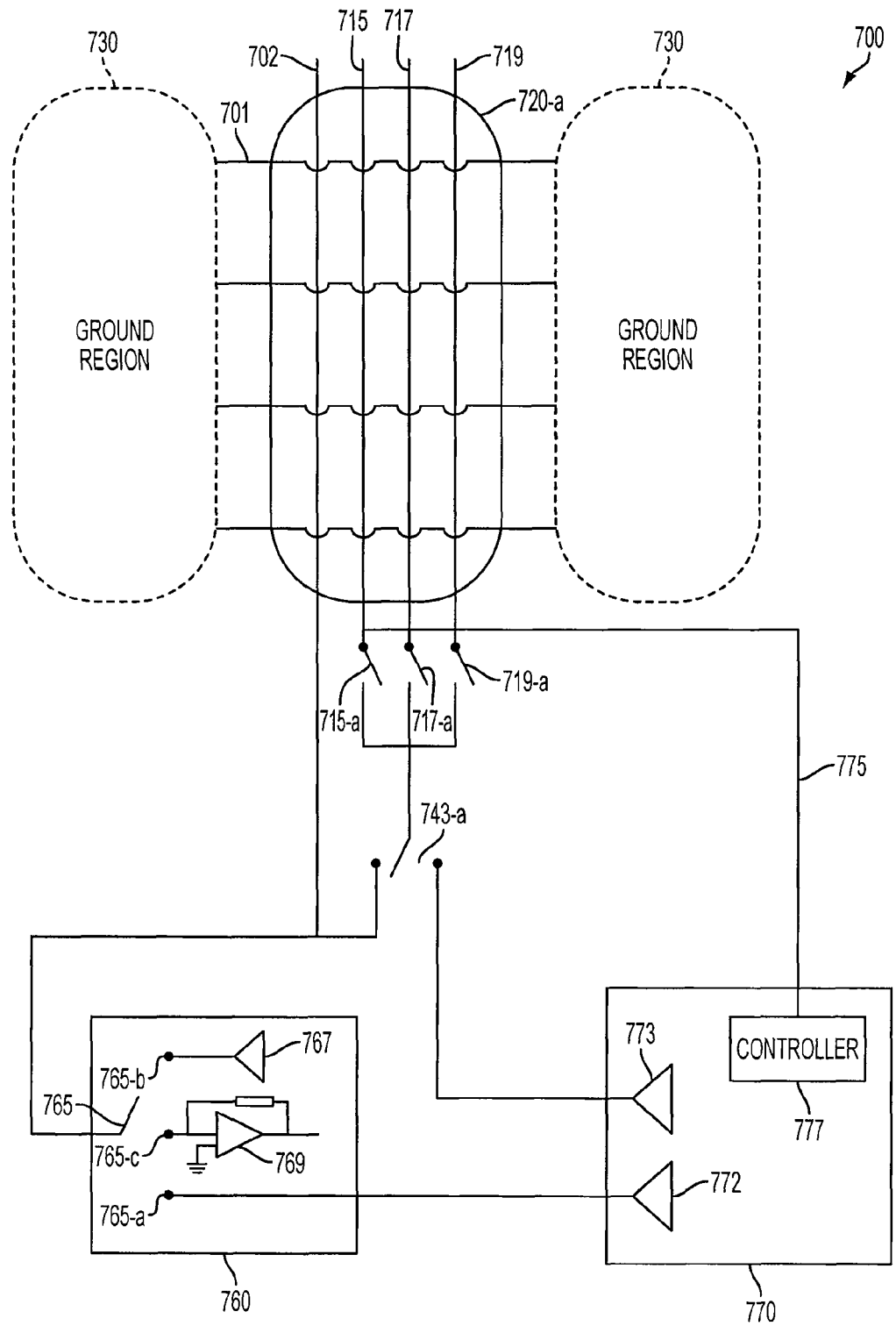
FIG. 7 illustrates an exemplary circuit that can switch data lines and sense lines in a sense region of an LCD between display and touch modes according to various embodiments.

FIG. 7 illustrates an exemplary circuit that can switch data lines and sense lines in a sense region of an LCD between display and touch modes according to various embodiments. In the example of FIG. 7, circuit 700 can include sense regions 720 having sense lines 702, which can be the vertical common voltage lines yVcom described previously, and red, green, and blue data lines 715, 717, 719, respectively. For simplicity, only one sense region 720-a is shown. However, it is to be understood that multiple sense regions 720 can be included in the LCD. Also, only one line of each of sense, red, green, and blue is shown. However, it is to be understood that multiple lines can be included in a sense region. As described previously, the sense regions 720 can sense a touch or near touch on the LCD. The sense lines 702 can connect to the touch circuit 760. The data lines 715, 717, 719 can be connected via respective switches 715-a, 717-a, 719-a to switch 743-a, which can connect the data lines to either touch circuit 760 during touch mode or to LCD circuit 770 during display mode. Drive lines 701 can pass unconnected under the sense regions 720 on their way to the next drive regions 710. This can be done to minimize parasitic capacitance created by the drive lines in the sense regions.

In operation, during touch mode, red, green, and blue data lines 715, 717, 719 can be switched via their respective switches 715-a, 717-a, 719-a to tie together to connect to switch 743-a, which can be switched to connect to the touch circuit 760. After switch 743-a, the data lines 715, 717, 719 can tie together with the sense line 702 to go to the touch circuit 760. In the touch circuit 760, switch 765 can connect at position 765-c to charge amplifier 769 in a sense channel, which can receive a touch signal from the sense region 720 for sensing a touch or near touch on the LCD.

During display mode, red, green, and blue data lines 715, 717, 719 can be switched via their respective switches 715-a, 717-a, 719-a to tie together to connect to switch 743-a, which can be switched to connect to LCD data driver 773, which can send data signals along the data lines for display. The sense line 702 can connect via switch 765 at position 765-a to the common voltage source 772 in the LCD circuit 770. Alternatively, in the touch circuit 760, the sense line 702 can connect via switch 765 at position 765-c to a common voltage source 767 in the touch circuit.

Switch controller 777 in the LCD circuit 770 can transmit control signals via control line 775 to switches 715-a, 717-a, 719-a to cause the switches to close during touch and/or display operation.

Figure 8:
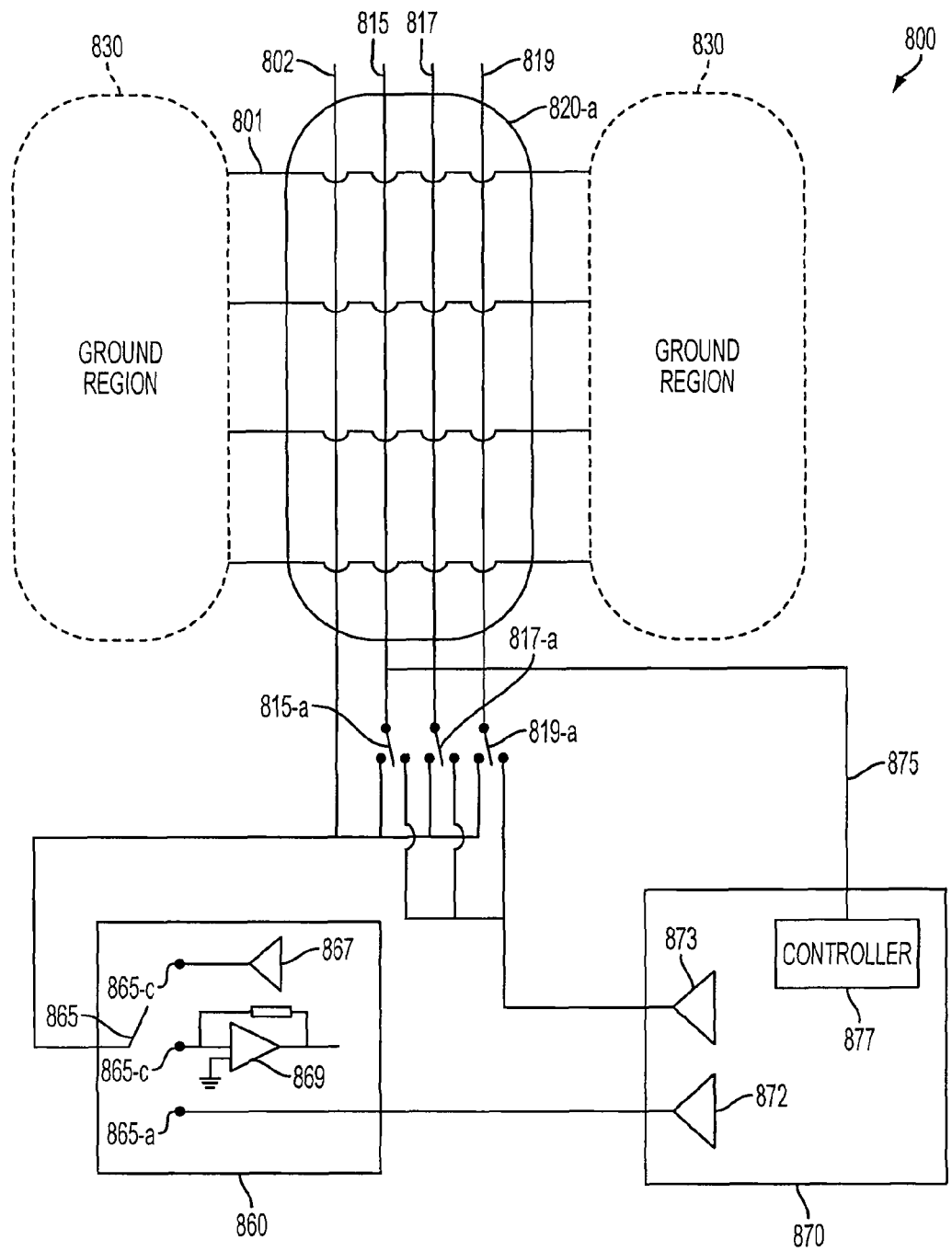
FIG. 8 illustrates another exemplary circuit that can switch data lines and sense lines in a sense region of an LCD between display and touch modes according to various embodiments.

FIG. 8 illustrates another exemplary circuit that can switch data lines and sense lines in a sense region of an LCD between display and touch modes according to various embodiments. In the example of FIG. 8, circuit 800 can include sense regions 820 having sense lines 802, which can be the vertical common voltage lines yVcom described previously, and red, green, and blue data lines 815, 817, 819, respectively. For simplicity, only one sense region 820-a is shown. However, it is to be understood that multiple sense regions 820 can be included in the LCD. Additionally, only one line for each of sense, red, green, and blue is shown. However, it is to be understood that multiple lines can be included in a sense region. The sense lines 802 can connect to the touch circuit 860. The data lines 815, 817, 819 can be connected via respective switches 815-a, 817-a, 819-a to either touch circuit 860 during touch mode or to LCD circuit 870 during display mode. Drive lines 801 can pass unconnected under the sense regions 820 on their way to the next drive regions 810.

In operation, during touch mode, red, green, and blue data lines 815, 817, 819 can be switched via their respective switches 815-a, 817-a, 819-a to tie to the sense line 802 and go to the touch circuit 860. In the touch circuit 860, switch 865 can connect at position 865-c to charge amplifier 869 in a sense channel, which can receive a touch signal from the sense region 820 for sensing a touch or near touch on the LCD.

During display mode, red, green, and blue data lines 815, 817, 819 can be switched via their respective switches 815-a, 817-a, 819-a to LCD data driver 873, which can send data signals along the data lines for display. The sense line 802 can connect via switch 865 at position 865-a to the common voltage source 872 in the LCD circuit 870. Alternatively, in the touch circuit 860, the sense line 802 can connect via switch 865 at position 865-c to a common voltage source 867 in the touch circuit.

Switch controller 877 in the LCD circuit 870 can transmit control signals via control line 875 to switches 815-a, 817-a, 819-a to cause the switches to switch based on the mode.

Although the switching circuits of FIGS. 5 through 8 are shown to be formed on the bottom border of the LCD, they are not so limited. Rather, the switching circuits can be formed either on the top border or split between both top and bottom borders of the LCD depending on the LCD chip area. The switching circuits can also be formed so as to be disposed in close proximity to the sense lines and the data lines to provide compactness on the LCD chip area.

Figure 9:
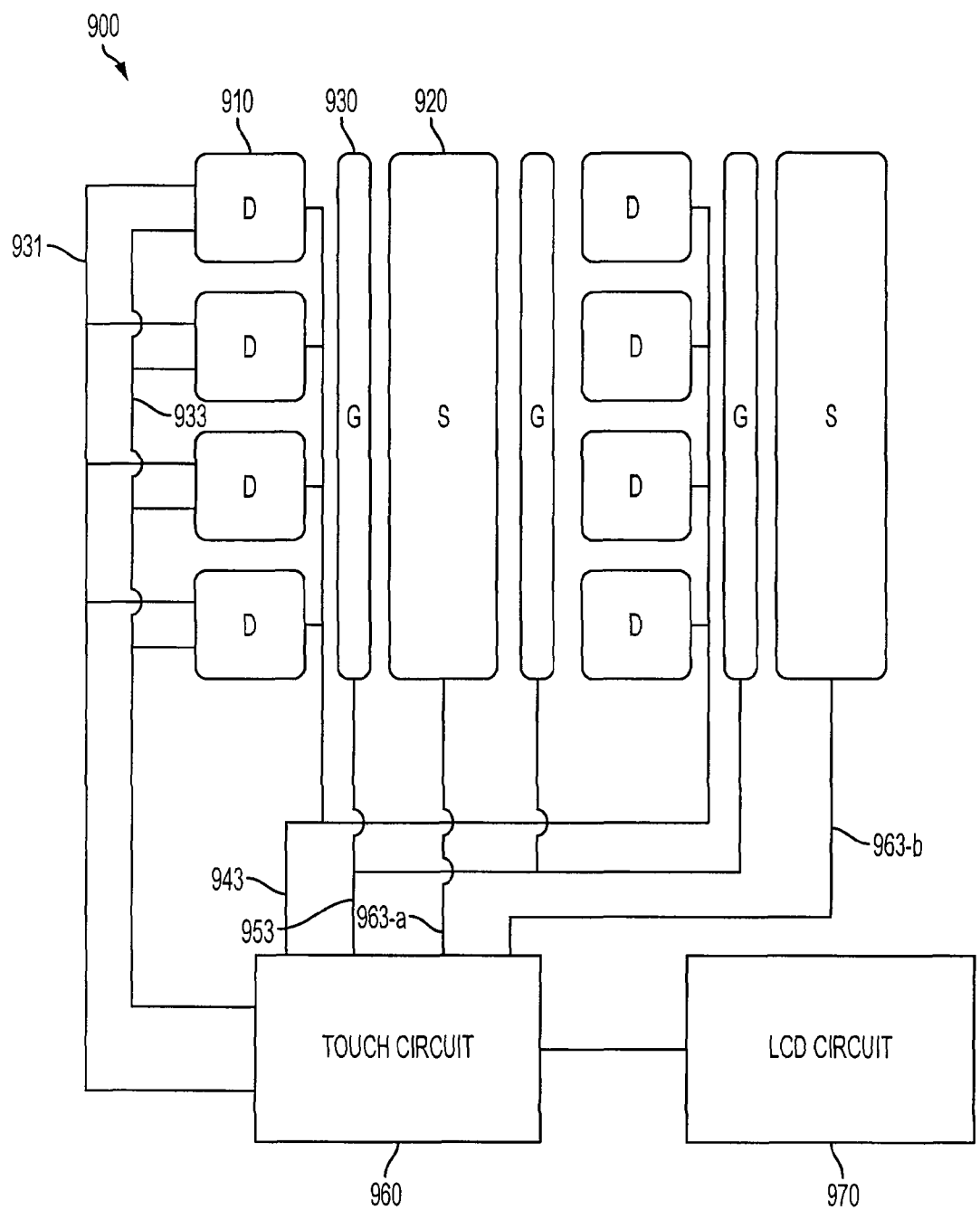
FIG. 9 illustrates an overview of an exemplary circuit that can switch touch regions, such as drive, ground, and sense regions, of an LCD between display and touch modes according to various embodiments.

FIG. 9 illustrates an overview of an exemplary circuit that can switch touch regions, such as drive, ground, and sense regions, of an LCD between display and touch modes according to various embodiments. In the example of FIG. 9, LCD 900 can include drive (D) regions 910, ground (G) regions 930, and sense (S) regions 920. The regions 910, 920, 930 can be connected to touch circuit 960 and to display circuit 970. For simplicity, the connections during touch mode are shown and the standard connections during display mode are omitted. However, it is to be understood that the LCD can include the standard connections for displaying graphics and data during display mode.

The drive regions 910 can have at least two connection 931, 933 to transmit stimulation signals from touch circuit 960 to the drive lines of the drive regions in order to stimulate the regions for receiving a touch or near touch during touch mode. The connections 931, 933 can also transmit voltage signals from LCD circuit 970 through touch circuit 960 to the drive lines of the drive regions in order to hold the drive lines at a common voltage for LCD pixels during display mode. Since the drive regions in each row of the LCD can be electrically connected to each other via their drive lines, a pair of connections 931, 933 can be associated with each row of drive regions, thereby transmitting the stimulation signals during touch mode and the voltage signals during display mode to the drive regions in that row.

The drive regions 910 can also have connection 943 to transmit voltage signals from either the touch circuit 960 or the LCD circuit 970 to the data lines of the drive regions in order to hold the data lines at a common voltage during touch mode. As a space saving measure, all the data lines in the drive regions 910 can be tied together to form a single connection 943 to the touch circuit 960. In display mode, the data lines can alternatively be connected to the LCD circuit 970 to receive data signals for display.

The ground regions 930 can have connection 953 to transmit voltage signals from either the touch circuit 960 or the LCD circuit 970 to the sense lines and the data lines of the sense regions in order to hold the sense and data lines at a common voltage during touch mode. As a space saving measure, all the sense and data lines in the ground regions 930 can be tied together to form a single connection 953 to the touch circuit 960. In display mode, the data lines can alternatively be connected to the LCD circuit 970 to receive data signals for display, while the sense lines can be connected to the touch circuit 960 via connection 953.

The sense regions 920 can have connections 963 to transmit touch signals from the sense lines of the regions to the touch circuit 960 in order to sense a touch or near touch on the LCD 900 during touch mode. The connections 963 can also transmit any residual data signals from the data lines associated with the sense lines to the touch circuit 960. Each sense region 920 can have its own connection 963 with the touch circuit 960 in order to sense the location of the touch or near touch. In display mode, the data lines can alternatively be connected to the LCD circuit 970 to receive data signals for display, while the sense lines can be connected via connection 963 to transmit voltage signals from either the touch circuit 960 or the LCD circuit 970 to the sense lines of the sense regions in order to hold the sense lines at a common voltage during display mode.

It is to be understood that the connections are not limited to those shown in FIG. 9, but can include any additional or other connections in any suitable configuration capable of switching the LCD between display and touch modes according to various embodiments.

Although the touch circuit and the LCD circuit are shown separately, all or portions of each can be integrated into the borders of an LCD chip or on an ASIC separate from the LCD chip.

It is to be understood that display and touch modes are not the only modes for which switching circuitry can be implemented, but can include additional or other modes of operation applicable to electronic devices according to various embodiments.

Figure 10:
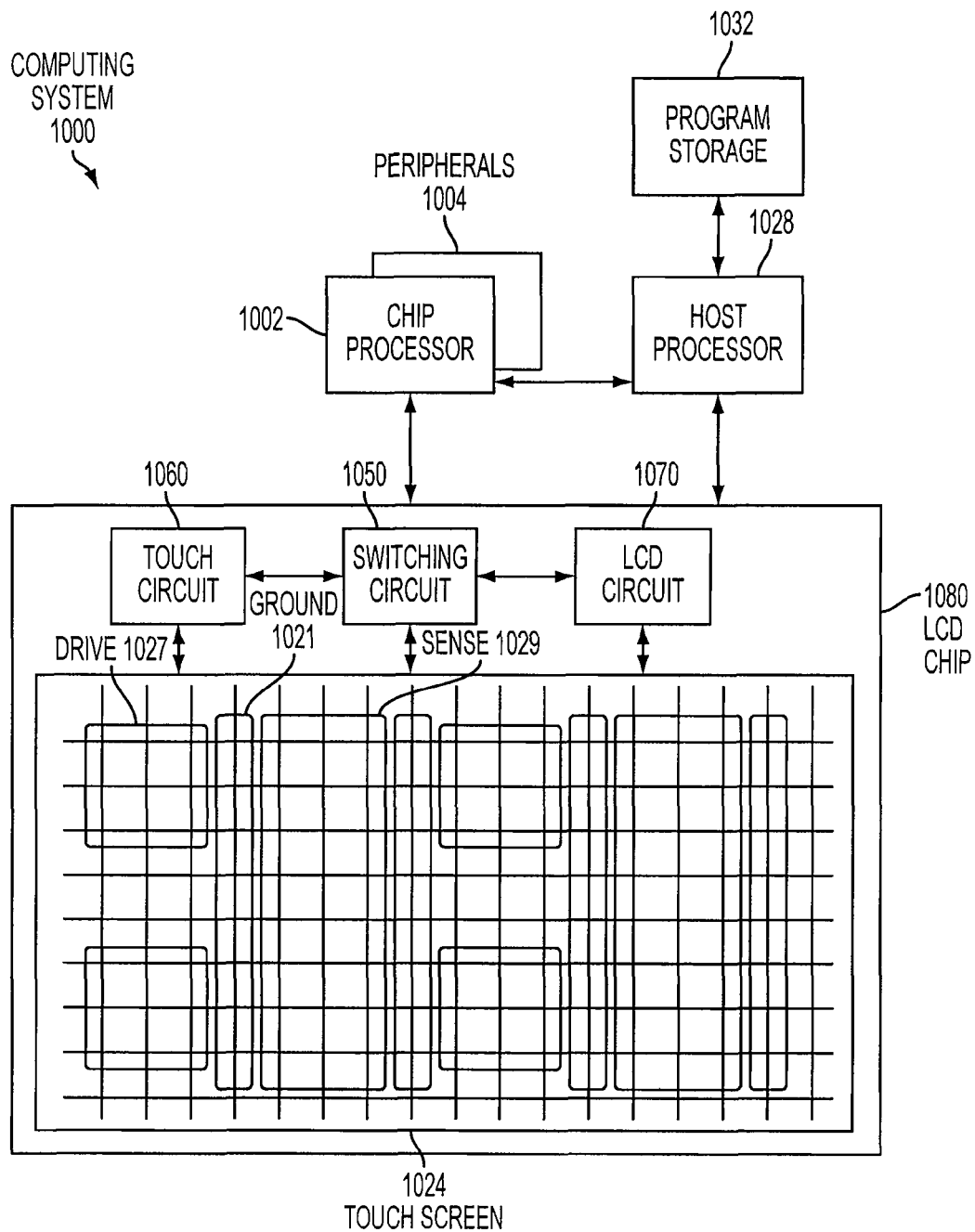
FIG. 10 illustrates an exemplary computing system having an LCD with circuitry to switch between display and touch modes according to various embodiments.

FIG. 10 illustrates an exemplary computing system that can include one or more of the various embodiments described herein. In the example of FIG. 10, computing system 1000 can include one or more chip processors 1002 and peripherals 1004. Peripherals 1004 can include, but are not limited to, random access memory (RAM) or other types of memory or storage, watchdog timers and the like.

Computing system 1000 can also include LCD chip 1080 having touch circuit 1060, LCD circuit 1070, and switching circuit 1050 around the border of the chip. Alternatively, all or portions of the circuits 1060, 1070, 1050 can be integrated on one or more ASICs separate from the LCD chip 1080. In some embodiments, chip processor 1002 and peripherals 1004 can also be integrated on one or more of the ASICs. The touch circuit 1060 can include, but is not limited to, one or more sense channels to sense a touch or near touch from sense regions of touch screen 1024, driver logic to generate stimulation signals at various phases that can be simultaneously applied to drive regions of the touch screen, and channel scan logic to read data from the sense channels, provide control signals to the channels, and control the driver logic. The LCD circuit 1070 can include, but is not limited to, one or more LCD data drivers to drive LCD pixels of the touch screen 1024 to display graphics or data and one or more Vcom modulation drivers to drive the xVcom and yVcom common voltage signals. The switching circuit 1050 can include, but is not limited to, multiple switches and connections to switch drive, sense, and data lines of touch screen 1024 between a touch mode and a display mode according to various embodiments.

LCD chip 1080 can also include touch screen 1024, which can have a capacitive sensing medium having drive regions 1027, ground regions 1021, and sense regions 1029 according to various embodiments. Each drive region 1027, ground region 1021, and sense region 1029 can include capacitive elements, which can be viewed as pixels 1026 and which can be particularly useful when touch screen 1024 is viewed as capturing an "image" of touch. (In other words, after touch circuit 1060 has determined whether a touch event has been detected in the touch screen, the pattern in the multi-touch screen at which a touch event occurred can be viewed as an "image" of touch (e.g. a pattern of fingers touching the screen).) The presence of a finger or other object near or on the touch screen can be detected by measuring changes to a signal charge present at the pixels being touched, which is a function of signal capacitance. Each sense region of touch screen 1024 can drive one or more sense channels in touch circuit 1060.

Computing system 1000 can also include host processor 1028 for receiving outputs from chip processor 1002 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and touch screen 1024 on LCD chip 1080 for providing a user interface to a user of the device.

Note that one or more of the functions described above can be performed by firmware stored in memory (e.g. one of the peripherals 1004 in FIG. 10) and executed by chip processor 1002, or stored in program storage 1032 and executed by host processor 1028. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer-readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch screen is not limited to touch, as described in FIG. 10, but may be a proximity screen or any other screen switchable between a display mode and a touch mode according to various embodiments. In addition, the touch sensor panel described herein can be either a single-touch or a multi-touch sensor panel.

Figure 11A:
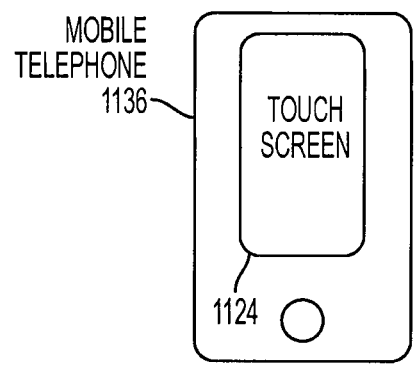
FIG. 11a illustrates an exemplary mobile telephone having an LCD with circuitry to switch between display and touch modes according to various embodiments.

FIG. 11a illustrates an exemplary mobile telephone 1136 that can include touch screen 1124 and other computing system blocks that can include circuitry for switching between display and touch modes of the telephone.

Figure 11B:
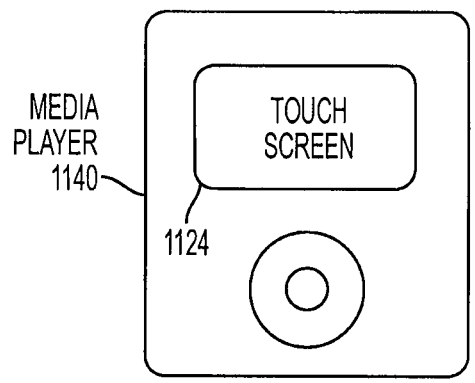
FIG. 11b illustrates an exemplary digital media player having an LCD with circuitry to switch between display and touch modes according to various embodiments.

FIG. 11b illustrates an exemplary digital media player 1140 that can include touch screen 1124 and other computing system blocks that can include circuitry for switching between display and touch modes of the media player.

Figure 11C:
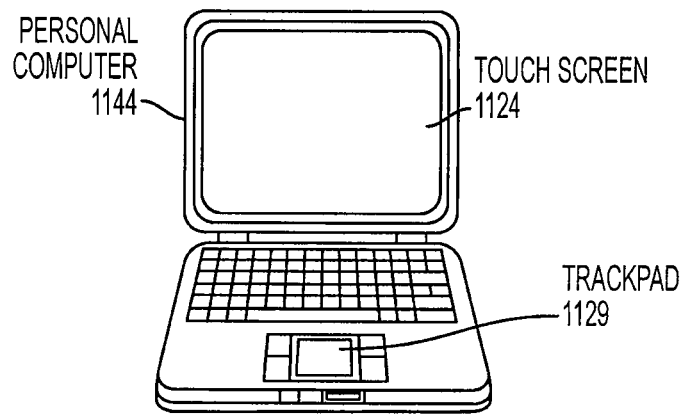
FIG. 11c illustrates an exemplary personal computer having an LCD with circuitry to switch between display and touch modes according to various embodiments.

FIG. 11c illustrates an exemplary personal computer 1144 that can include touch screen 1124, touch sensor panel (trackpad) 1126, and other computing system blocks that can include circuitry for switching between display and touch modes of the personal computer.

The mobile telephone, media player, and personal computer of FIGS. 11a, 11b and 11c can be thinner, lighter, and power saving with an LCD having display and touch modes with switching circuitry on the LCD chip according to various embodiments.

Although various embodiments have been fully described with reference to the accompanying drawings, it is to be noted that various changes and modifications will become apparent to those skilled in the art. Such changes and modifications are to be understood as being included within the scope of various embodiments as defined by the appended claims.

What is claimed is:

1. A circuit for switching an integrated touch screen between different modes, comprising: one or more switches configured to switch a data line, a sense line, and a drive line between a first configuration associated with a display mode and a second configuration associated with a touch mode, wherein during the touch mode, the data line is coupled to receive a common voltage and the drive line is configured to stimulate one or more drive regions during the touch mode, the data line, sense line, and drive line being distinct lines.

2. The circuit of claim 1, wherein the first configuration comprises at least one drive line being switched to receive a common voltage signal.

3. The circuit of claim 1, wherein the first configuration comprises the data line being switched to receive a data signal.

4. The circuit of claim 1, wherein the first configuration comprises the sense line being switched to receive a common voltage signal.

5. The circuit of claim 1, wherein the second configuration comprises drive lines being switched to receive a stimulation signal.

6. The circuit of claim 5, wherein the first configuration comprises the sense line coupled to receive a common voltage signal.

7. The circuit of claim 1, comprising:
a controller configured to control the one or more switches.

8. The circuit of claim 1 incorporated into an integrated touch screen.

9. The circuit of claim 1 incorporated into at least one of a mobile telephone, a digital media player, or a personal computer.

10. A touch sensitive display switchable between different modes, the device comprising: a display pixel having a drive line, a sense line, and a data line, the drive line, sense line, and data line being distinct lines; and a circuit having one or more switches configured to switch the data line and drive line between a display mode and a touch mode, wherein in the touch mode, the data line is coupled to receive a common voltage and the drive line is configured to stimulate one or more drive regions during the touch mode.

11. The touch sensitive display of claim 10, comprising:
a drive region comprising the display pixel,
wherein the drive line of the display pixel is coupled to receive a stimulation signal during the touch mode and to receive a common voltage signal during the display mode.

12. The touch sensitive display of claim 11, comprising:
a drive region comprising the display pixel,
wherein the data line is coupled to receive a data signal during the display mode.

13. The touch sensitive display of claim 10, comprising:
a ground region comprising the display pixel,
wherein in the display mode, the circuit is configured to couple the data line to receive a data signal.

14. The touch sensitive display of claim 10, comprising:
a ground region comprising the display pixel,
wherein in the touch mode, the circuit is configured to couple the sense line to receive a common voltage.

15. The touch sensitive display of claim 10, comprising:
a touch circuit configured to receive a touch signal from the sense line and to send a stimulation signal to the drive line during the touch mode.

16. The touch sensitive display of claim 10, comprising:
a display circuit configured to send a data signal to the data line during the display mode.

17. A method for switching between different modes in a touch sensitive display, comprising: providing a plurality of pixels in a touch sensitive display having a display mode and a touch mode; and switching a data line, a sense line, and a drive line between the display mode and the touch mode, wherein in the touch mode, the data line is coupled to receive a common voltage and the drive line is configured to stimulate one or more drive regions during the touch mode, the data line, sense line, and drive line being distinct lines.

18. The method of claim 17, wherein the switching comprises:
for the touch mode, switching the sense line to connect to a touch circuit for sensing a touch or near touch and switching drive line to connect to the touch circuit for driving a stimulation signal.

19. The method of claim 17, wherein the switching comprises:
for the display mode, switching the sense line to receive a common voltage, switching drive line to receive the common voltage, and switching the data line to connect to a display circuit for displaying graphics or data.

20. An integrated touch screen switchable between different modes, comprising: a plurality of pixels having different modes including a touch mode and a display mode; and a circuit comprising at least one switch configured to switch at least one of a drive line, a sense line, or a data line between the display mode and the touch mode, wherein the data line, drive line, and sense line are distinct lines and the at least one switch is configured to couple the data line to receive a common voltage in the touch mode and at least one switch configured to couple the drive line to stimulate one or more drive regions during the touch mode.

21. A touch sensitive display having a display mode and a touch mode comprising:
at least a first and second drive region; each drive region having a plurality of pixels having data lines and common electrodes, the plurality of pixels in each of the first and second drive regions having the common electrodes thereof coupled together;
at least a first sense region disposed between the first and second drive regions; the first sense region having a plurality of pixels having data lines and common electrodes and sense lines distinct from the data lines, the plurality of pixels in the first sense region having the common electrodes thereof coupled together;
a plurality of drive lines coupling the common electrodes of the first and second drive regions together while bypassing the common electrodes of the first sense region;
the data lines of the first and second drive regions coupled to receive a common voltage during the touch mode.

22. The touch sensitive display of claim 21, further comprising at least one ground region disposed between the first and second drive regions, the ground region having a plurality of pixels having data lines and common electrodes; the data lines and common electrodes coupled to receive the common voltage during the touch mode.

23. The touch sensitive display of claim 22, wherein the at least one ground region comprises a first ground region disposed between the first drive region and the at least one sense region and a second ground region disposed between the at least one sense region and the second drive region.

24. The touch sensitive display of claim 23 wherein each of the first and second ground regions have a plurality of pixels having data lines and common electrodes; the data lines and common electrodes coupled to receive the common voltage during the touch mode.

25. The touch sensitive display of claim 22, wherein the data lines of the ground region are coupled to display circuitry during the display mode.

26. The touch sensitive display of claim 21, wherein the data lines of the first and second drive regions are coupled to display circuitry during the display mode.

* * * * *